(12) United States Patent
Nakhimov

(10) Patent No.: US 9,189,028 B2
(45) Date of Patent: Nov. 17, 2015

(54) PORTABLE COMPUTER-COMMUNICATOR DEVICE WITH ROLLABLE DISPLAY

(71) Applicant: Serguei Nakhimov, Woodbridge (CA)

(72) Inventor: Serguei Nakhimov, Woodbridge (CA)

(*) Notice: Subject to any disclaimer, the term of this patent is extended or adjusted under 35 U.S.C. 154(b) by 0 days.

(21) Appl. No.: 14/318,985

(22) Filed: Jun. 30, 2014

(65) Prior Publication Data

US 2015/0002398 A1    Jan. 1, 2015

Related U.S. Application Data

(60) Provisional application No. 61/841,905, filed on Jul. 1, 2013.

(51) Int. Cl.
*G06G 1/16* (2006.01)
*G06F 3/0488* (2013.01)
*G06F 3/0354* (2013.01)
*G06F 1/16* (2006.01)

(52) U.S. Cl.
CPC ............ *G06F 1/1652* (2013.01); *G06F 1/1643* (2013.01); *G06F 1/1669* (2013.01); *G06F 3/03543* (2013.01); *G06F 3/04886* (2013.01)

(58) Field of Classification Search
CPC ... G06F 1/1652; G06F 1/1601; G06F 1/1613; G06F 1/1615; G06F 1/1616; G06F 1/1618; G06F 1/1622; G06F 1/1624; G06F 1/1633; G06F 1/1641; G06F 1/1669; G06F 1/1671; G06F 3/03543; G06F 3/04886; G06F 1/133305
See application file for complete search history.

(56) References Cited

U.S. PATENT DOCUMENTS

| | | | | |
|---|---|---|---|---|
| 7,636,085 | B2* | 12/2009 | Yang | 345/204 |
| 8,096,068 | B2* | 1/2012 | Van Rens | 40/515 |
| 8,665,236 | B2* | 3/2014 | Myers | 345/173 |
| 2002/0070910 | A1* | 6/2002 | Fujieda et al. | 345/85 |
| 2003/0048256 | A1* | 3/2003 | Salmon | 345/168 |
| 2003/0160892 | A1* | 8/2003 | Tamura | 348/375 |
| 2005/0040962 | A1* | 2/2005 | Funkhouser et al. | 340/815.4 |
| 2006/0038745 | A1* | 2/2006 | Naksen et al. | 345/30 |
| 2007/0153461 | A1* | 7/2007 | Singh et al. | 361/683 |
| 2007/0211036 | A1* | 9/2007 | Perkins | 345/173 |
| 2008/0013292 | A1* | 1/2008 | Slikkerveer et al. | 361/749 |
| 2008/0049003 | A1* | 2/2008 | Hasegawa | 345/206 |
| 2008/0212271 | A1* | 9/2008 | Misawa | 361/681 |
| 2011/0018820 | A1* | 1/2011 | Huitema et al. | 345/173 |
| 2011/0043479 | A1* | 2/2011 | van Aerle et al. | 345/174 |
| 2012/0050075 | A1* | 3/2012 | Salmon | 341/20 |
| 2013/0314762 | A1* | 11/2013 | Kwack et al. | 359/280 |
| 2014/0099479 | A1* | 4/2014 | Krall et al. | 428/174 |
| 2014/0268532 | A1* | 9/2014 | Nicol et al. | 361/679.26 |
| 2015/0029229 | A1* | 1/2015 | Voutsas | 345/661 |
| 2015/0047796 | A1* | 2/2015 | Peng et al. | 160/323.1 |

FOREIGN PATENT DOCUMENTS

EP          1912416 A2 *  4/2008
JP       2004118794 A  *  4/2004

(Continued)

OTHER PUBLICATIONS

McGoldrick, K.; "Mobile Friendly Rollable Displays"; Sep. 19-21, 2006; IEEE; Proceeding of the 36th European Solid State Device Research Conference, 2006. ESSDERC 2006; pp. 1-2.*

*Primary Examiner* — John Villecco

(57) ABSTRACT

A portable electronic multi-functional computer-communicator device is described which has a flexible rollable display and may be converted to various states and shapes, each designed to replace certain class or classes of existing electronic devices.

17 Claims, 19 Drawing Sheets

(56) References Cited

FOREIGN PATENT DOCUMENTS

| JP | 2009021660 A | * | 1/2009 |
| JP | 2011081069 A | * | 4/2011 |
| JP | 2011253029 A | * | 12/2011 |
| JP | 2013242531 A | * | 12/2013 |
| WO | WO 2008059345 A2 | * | 5/2008 |
| WO | WO 2008133510 A2 | * | 11/2008 |
| WO | WO 2009139495 A1 | * | 11/2009 |

* cited by examiner

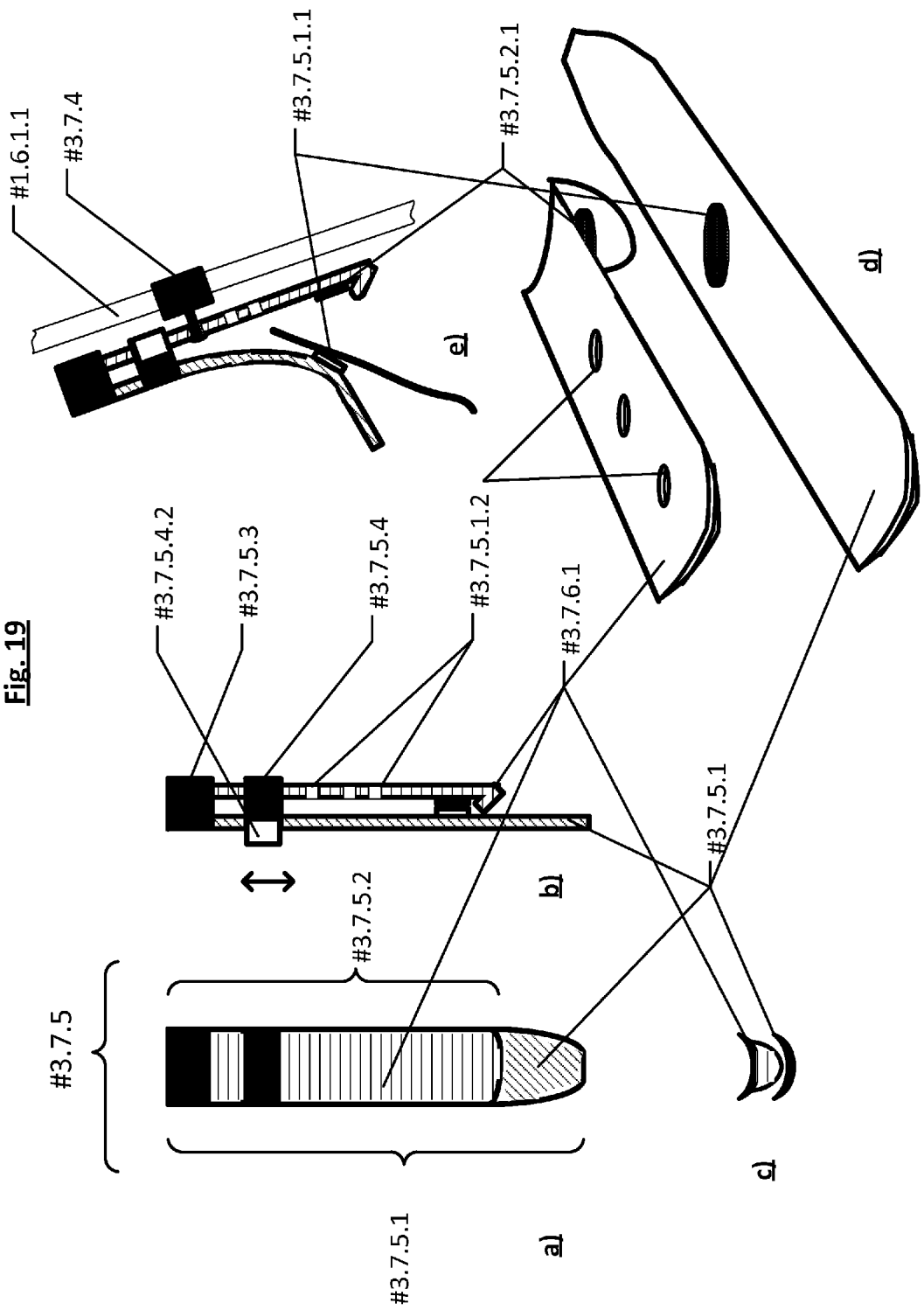

PORTABLE COMPUTER-COMMUNICATOR DEVICE WITH ROLLABLE DISPLAY

CROSS-REFERENCE TO THE PRIOR APPLICATION

This Application is claiming the benefit of
the U.S. Provisional Application No. 61/841,905
Filing date: 1 Jul. 2013
EFS ID: 16211549
Confirmation number: 2929.

BACKGROUND

1. Field of the Described Embodiments

The described embodiments relate to portable electronic device that can also be used on a desktop or when mounted in a vehicle. In particular methods for expanding the functionality and improving usability of electronic devices are disclosed.

2. Related Art

In the recent years, the classes of portable computer-communicator devices called "smartphones" and "tablets" have experienced dramatic advancements and improvements, primarily in the fields of data processing/remote data communication performance and multimedia input/output capabilities. With powerful processors, fast data communication capabilities, vast memory storage and large high-resolution displays, these devices have a strong potential each to perform nearly every task related to data processing, data input/output or remote voice/data communication that a person may encounter while on the go or away from a desk. However, their other characteristics important for consumers—general and specific usability, operational convenience, data security, physical reliability, upgradeability, battery life—have stayed at approximately same levels or even deteriorated.

In many cases, the limiting factor preventing tablets and smartphones to perform the majority of tasks small laptop PCs (ultrabooks) are used for, is not processor speed (computational power) or memory size or battery life—it's insufficient user interface capabilities.

The existence of the vast majority of such devices in a single form factor only (namely the flat planar one), without any shape or form factor conversion capabilities, is becoming a limiting factor not only for functional expansion, but for attempts of designers to bring operational convenience and reliability of such devices to a normal level easily achievable (for a subset of functions supported by a common smartphone or tablet) by many alternative devices, for example watches, cameras and computer keyboards.

The flat planar form factor with a large display on one side and fixed main camera on other side is generally suitable for a multitude of possible applications but fits well only a few of them and creates significant handling inconvenience and operational problems for others. For example, for photo or video shooting the user has to hold the unit at its edges to avoid blocking or accidentally touching the display. The sides of the unit have become narrow and as a result the number of physical buttons has decreased to a minimum—so for almost every function or command, even for the most common ones like camera shutter or zoom control, the user has to use virtual buttons or menus on the display and therefore has to look at it the latter very often. Such mode of handling, combined with narrow, often slippery sides of the unit, highly increase chances of the device being dropped and broken or lost. Bottom line is that the prevalent form factor with a large touch-sensitive display on one side of a flat planar body does not allow the user to have a convenient grip, required not only when shooting photos or videos but also in many other common situations: phone call, video chat, interactive video game etc. Moreover, many smartphones made in the last couple of years are too wide to be carried comfortably in a pocket or operated by one hand.

Text typing using a virtual keyboard on a tablet or a smartphone is another example of a very inconvenient operation. It requires high visual concentration and coordination of fingers. In most situations, maximum two fingers can be used. There's no reliable tactile feedback from virtual keys (especially before they are actually pressed) so typing is slow and prone to errors. The few available models featuring mechanical keyboards bring additional problems such as increase in device size and weight, decrease in display size, and mechanical keys being still too small to be convenient. As a rule, the keys are located in the same plane as the display so convenient desktop operation is not possible. The last problem also applies to a recently introduced solution featuring a combination of a displayed virtual keyboard and a physical protrusions appearing permanently or on-demand at the display surface over virtual keys. Even traditional full-size mechanical keyboards used in a bundle with desktop PCs, laptops, tablets and smartphones have significant drawbacks: they are bulky items that cause strain to user's eyes (because for many users their sight has to be constantly switched between the display and the keys) and to user's hands (because the palms have to be kept raised above the desk surface and constantly moved).

The usability of a common smartphone or a tablet for specific situations may be improved by addition of accessories that vast majority of users purchase separately, for example back covers, cradles/stands, carrying pouches, wireless earpieces etc. Unfortunately, these accessories often bring their own inconveniences: they reduce portability of the device and oblige the user to carry, store and locate additional pieces, including chargers or other accessories for accessories.

If a smartphone or a tablet is carried in a pocket or a bag, it may take few seconds or even more time for the user to locate, take and activate it. This can be critical in certain situations requiring immediate response such as call answer or photo/video shooting start. The lack of physical buttons also contributes to such delays because the user has to use long menu paths and/or virtual controls requiring visual attention and therefore a specific positioning of the device body to operate.

Even interaction with common accessories while performing standard tasks may present a problem. A smartphone can easily become misplaced, forgotten in a pocket or a bag, lost or stolen. Accepting the call requires first to locate the phone, then to take it properly in hand, then to operate a virtual (in most cases) control. Usage of wireless earpieces is limited by additional overhead these devices bring in the form of necessity to store the small device, to track/remember its location, to charge it separately and possibly carry additional accessories for this accessory.

The bottom line is the majority of users have to purchase and carry daily two or three devices out of the list:
smartphone
tablet
laptop The reason is each of these three classes has undergone optimization for a specific usage pattern: a smartphone for on-the-go operation, a tablet for using when standing occasionally or sitting (but without a desk), and a laptop to be used at a desk.

The problem is not only in necessity to buy and carry two or three devices of different types, together with many accessories, to fulfill daily tasks. The real magnitude of this consumer problem lies in the fact that many of the common tasks (such as photo/video shooting, text typing, gaming, professional applications etc.) are not supported with satisfactory levels of efficiency, flexibility and convenience, even by the most suitable representatives of the three device classes.

The crossover-type devices that have been produced recently such as enlarged smartphones;

small tablets;

laptops convertible to smartphones (via flipping touchscreens, double displays etc.)

are combining drawbacks of their two classes as well as advantages. The users need the benefits of each device class at a certain time, not a compromising solution at all times.

Some prototypes that were announced are convertible devices utilizing flexible displays and capable of conforming to shapes and functional profiles of two devices from separate classes—i.e. a smartphone and a tablet. However, these prototypes do not solve many of the problems (insufficient display size, display is not kept flat, very limited camera size and therefore quality, no convenient text typing mode etc.).

As a result, none of the devices existing currently—either on the market or as a prototype is capable of efficiently replacing a smartphone, a tablet, an ultrabook and a high-quality point-and-shoot camera at the same time.

SUMMARY OF THE DESCRIBED EMBODIMENTS

In a first aspect there is provided, a portable computer-communicator device comprising:

a core module; and a flexible assembly attached by its one side to the core module and capable of being rolled around the core module, the flexible assembly further comprising a flexible rollable display.

In a second aspect there is provided, a wireless earpiece device comprising:

an outer body, and wireless mouse components.

BRIEF DESCRIPTION OF THE DRAWINGS

The described embodiments and the advantages thereof may best be understood by reference to the following description taken in conjunction with the accompanying drawings. These drawings in no way limit any changes in form, shape, composition, material and detail that may be made to the described embodiments by a person skilled in the art without departing from the spirit and scope of the described embodiments.

FIG. 19 shows the 5 views of the Universal Clip; its three projections, a partial 3D view and a view of Universal clip attached to the Fixture Rod and being engaged by a clothing or bag part.

DETAILED DESCRIPTION OF EXAMPLE EMBODIMENTS

Representative applications of methods and apparatus according to the present application are described in this section. These examples are being provided solely to add context and aid in understanding of the described embodiments. It will thus be apparent to one skilled in the art that the described embodiments may be practiced without some or all of these specific details. In other instances, well known process steps or device components or properties of device components have not been described in detail in order to avoid unnecessarily obscuring the described embodiments. Other applications are possible, such that the following examples should not be taken as limiting.

In the following detailed description, numbered references (for example: #1.2.3) are made to the accompanying drawings, which form a part of the description and in which are shown, by way of illustration, specific example embodiments in accordance with the described embodiments. Also, similar references are made to the detailed structure of these specific example embodiments outlined in the Appendix to the Specification. Although these embodiments are described in sufficient detail to enable a person skilled in the art to practice the described embodiments, it is understood that these examples are not limiting; such that other embodiments may be used, and changes may be made without departing from the spirit and scope of the described embodiments

1. Overview

Described herein is a portable multi-function computer-communicator device referred from this point on as "the device". Among its principal components, it comprises:

- a flexible assembly called the Roll (#1) that can be rolled around the cylindrical Core Module (#2) it is attached to at one end and that comprises a flexible touch-sensitive Display (#1.1);
- an Outer Module (#3) that is permanently or semi-permanently attached to the Roll (#1) at the other end;
- two flexible Touchpad Keyboards (#1.6 and @1.7) that can be either reversibly attached to the device (the latter acting as a host device) or either electrically connected to it via cables or connected wirelessly;
- a Removable Earpiece unit which converts to a wireless mouse and can also perform functions of a remote control unit;
- a retractable, rotating Camera Module;
- and a projection Round Screen that also serves as a protective cap for a retractable Viewfinder assembly.

The flexible, retractable and/or removable components some of which are mentioned above allow the device to be convertible and thus to be able to take various States as it changes its shape and/or composition to accommodate to different user applications or utilization modes.

Figure 16:
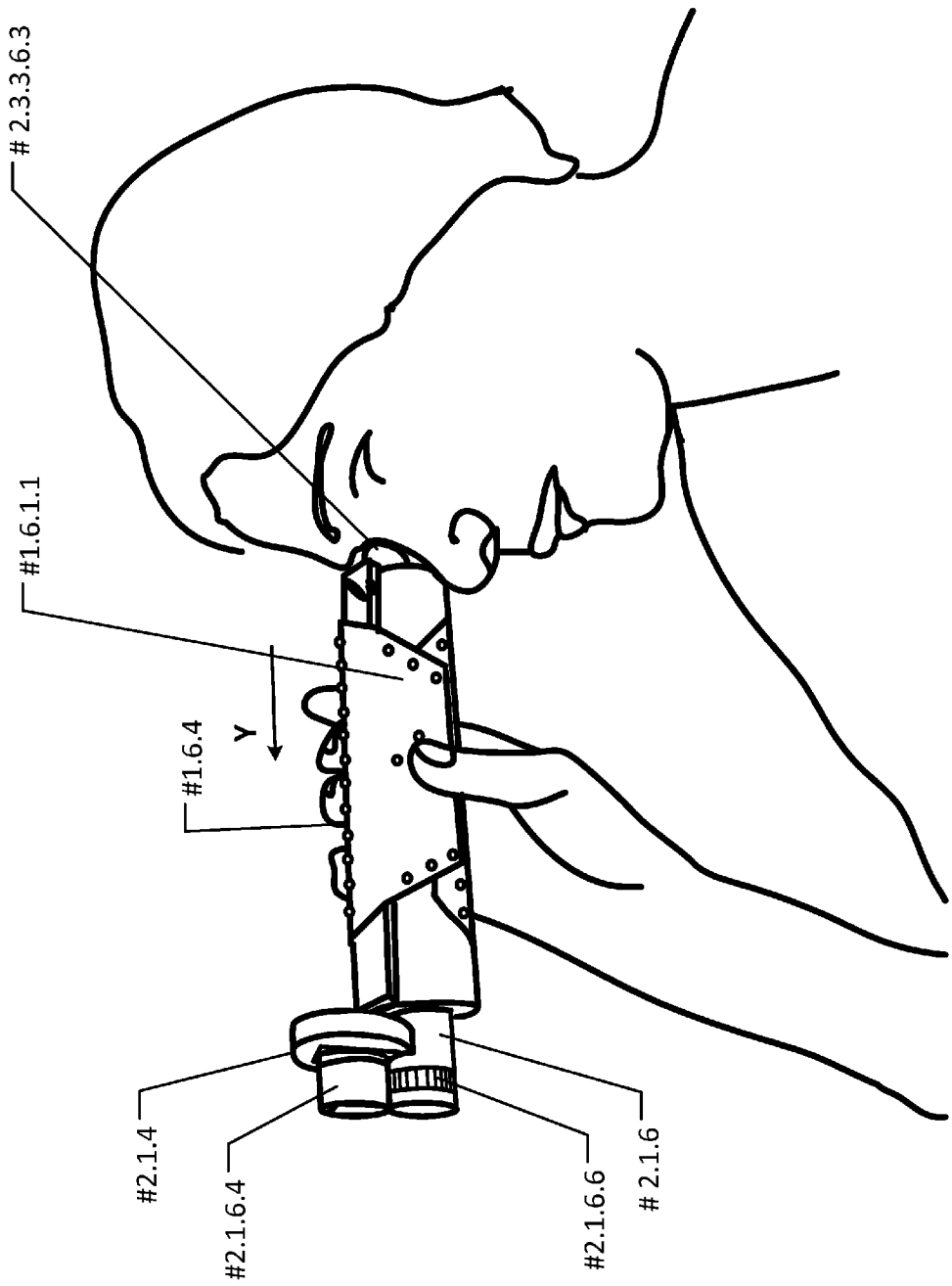
FIG. 16 shows the device in its Rolled State being held by the user with a single hand during photo or video shooting, with the Touchpad Keyboards attached, the Removable Earpiece in its Attached Position Mode, the Camera Module in its Partially Extended Position, the Viewfinder assembly in its Extracted-Open Position supporting the Viewfinder Display Mode.
Figure 17:
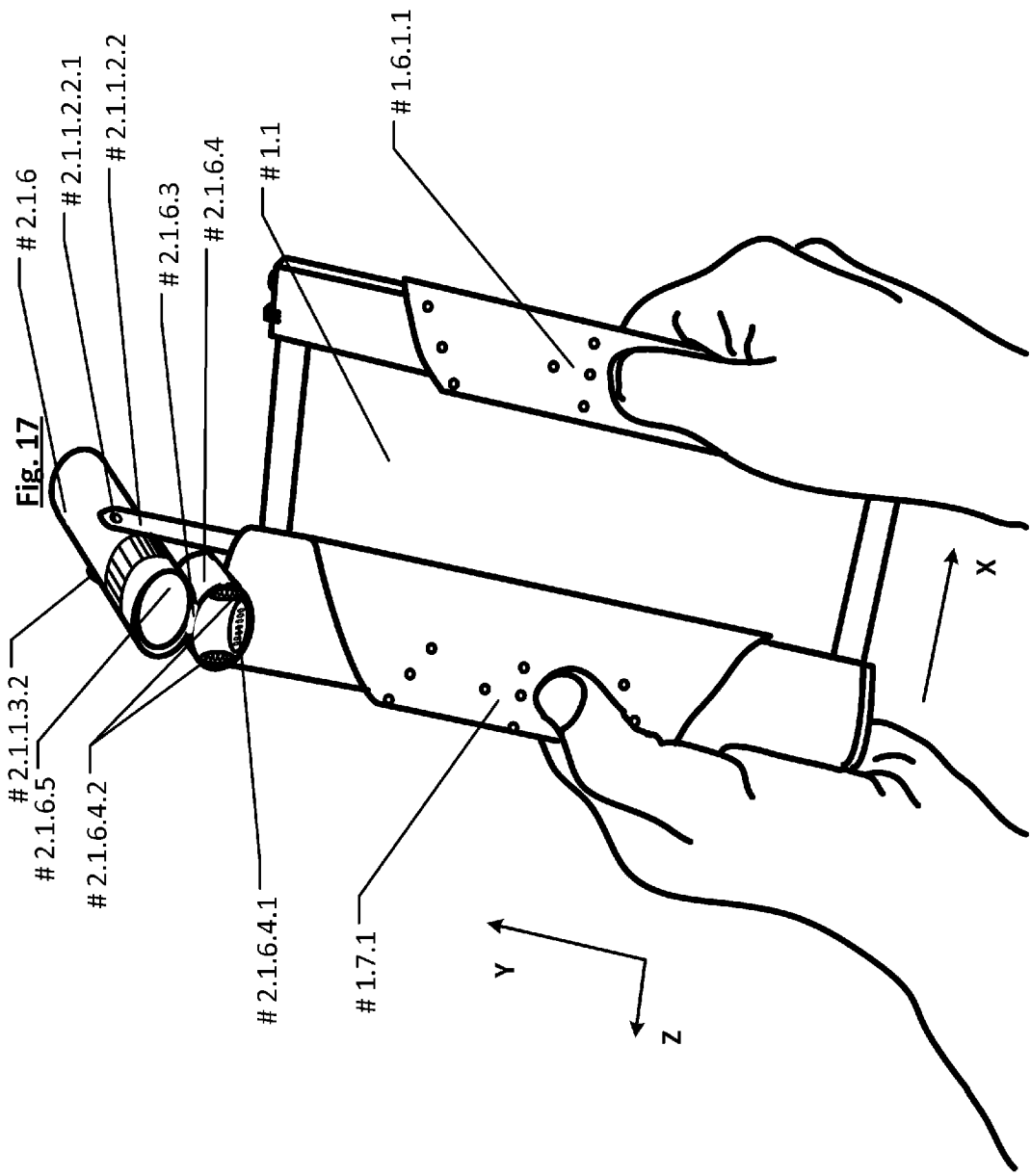
FIG. 17 shows a front view of the device in its Half-rolled State, being held by the user's both hands, with the Touchpad Keyboards attached, the Removable Earpiece detached and not shown, the Camera Module in its Fully Extended Position facing the user to support video chat etc., the Viewfinder assembly in its Retracted Position.
Figure 18:
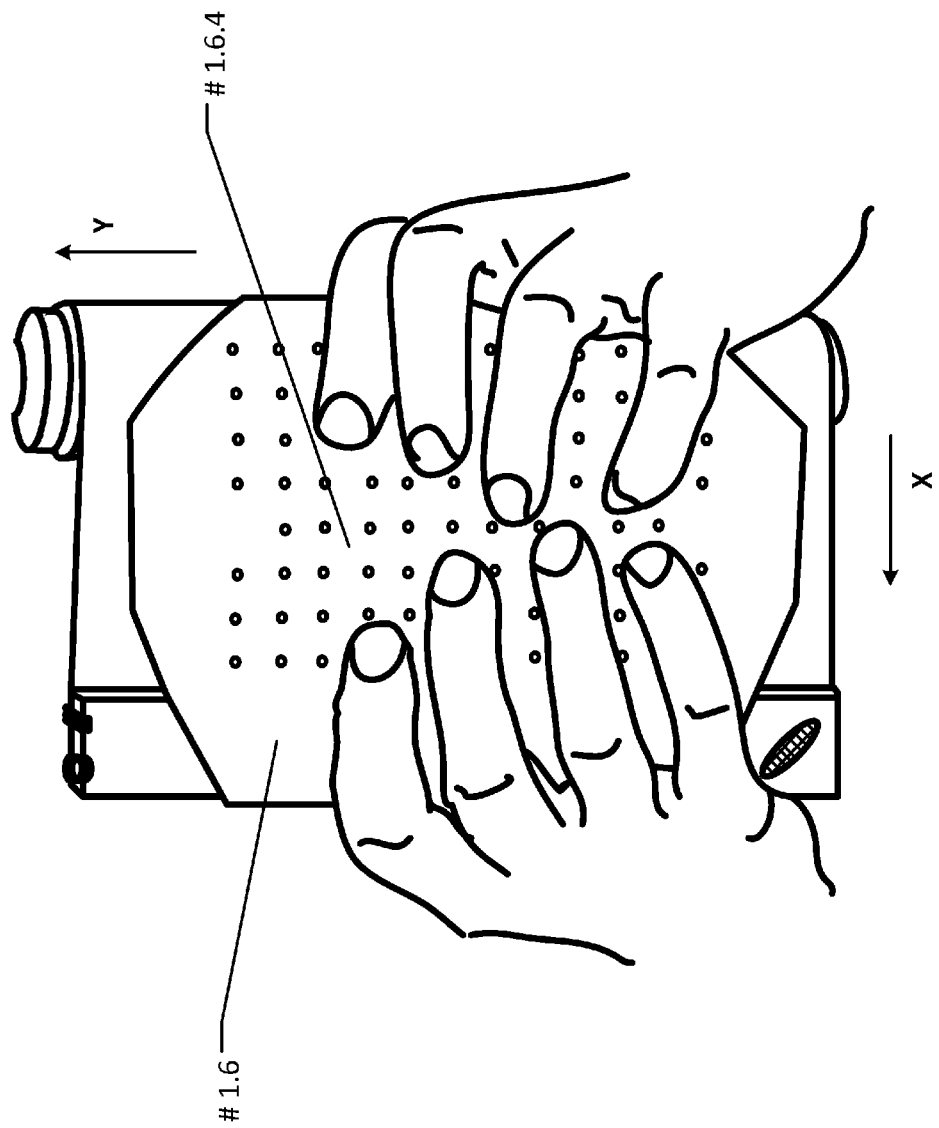
FIG. 18 shows a back view of the device in its Half-rolled State, being held by the user's both hands arranged in a position suitable for text typing etc., with the Touchpad Keyboards attached, the Removable Earpiece in its Attached Position capable of supporting the Remote Control Mode, the Camera Module in its Retracted Position, the Viewfinder assembly in its Retracted Position.

The four main States the device can take are:
1) Unrolled (shown on FIGS. 1,2,3,4,5)
2) Desktop Unrolled (shown on FIG. 11)
3) Rolled (shown on FIGS. 12,13,14,15,16)
4) Half-rolled (shown on FIGS. 17,18)

Certain components of the device may have their own states called Positions or Modes as described below.

2. Key Features, Primary Functions, Main Benefits

In this paragraph, the key components and features of the device are described within a paragraph dedicated to the most relevant for these components and features device's State.

2.1 Unrolled State

In this State, the device resembles a common tablet PC by its form, functions and handling. However, the device does feature advanced capabilities not found in such existing devices—due to the functions supported by its Touchpad Keyboards (#1.6 and #1.7) and the Removable Earpiece (#2.4.1), as described below. In addition, the Core Module (#2) and the Outer Module (#3) can act as handles supporting more convenient two- or single-hand operation, especially when typing a text or entering commands using the Touchpad Keyboards (#1.6 and #1.7 for both hands). See FIGS. 1 and 4 for details.

Figure 1:
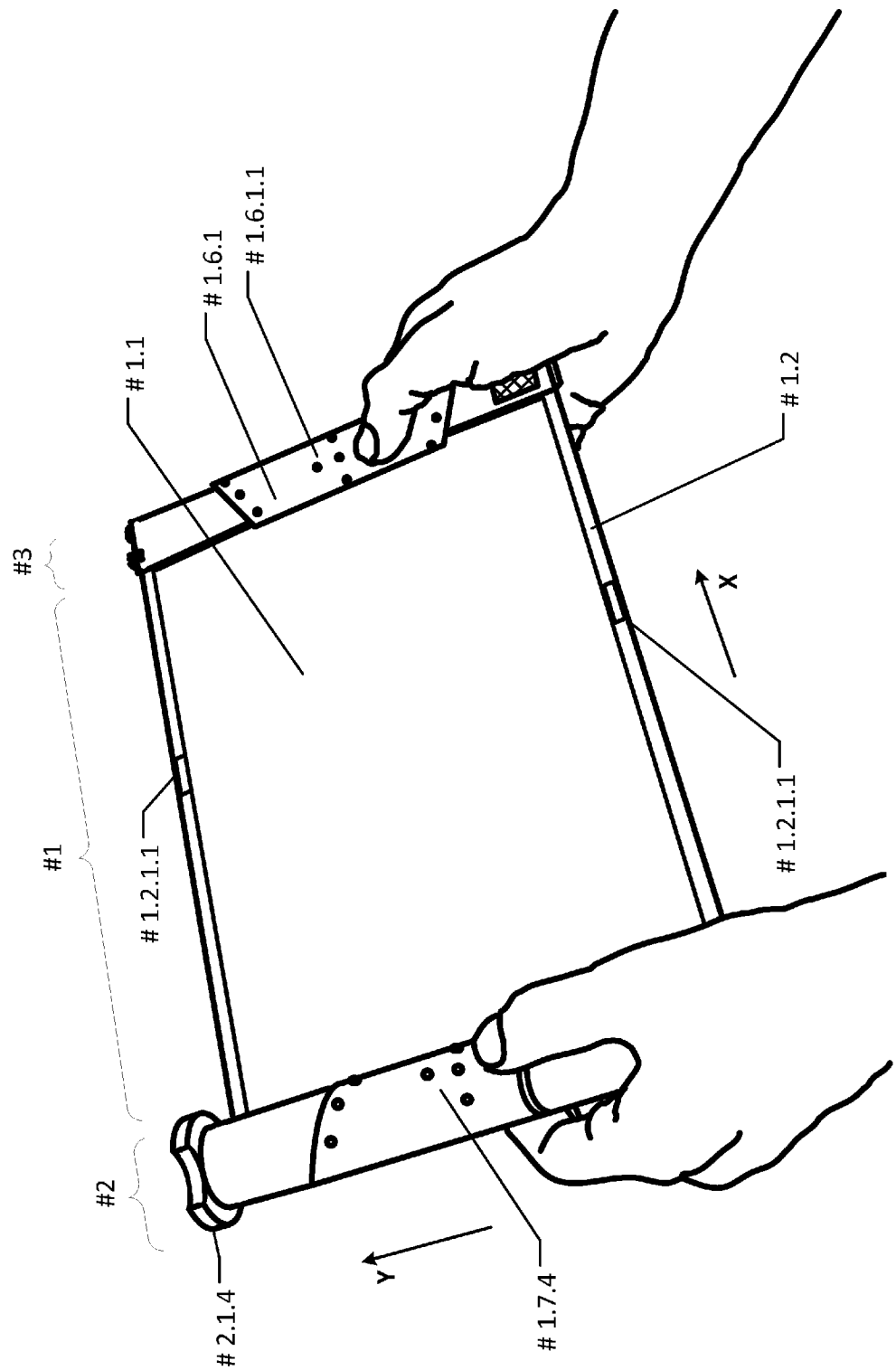
FIG. 1 Shows a front view of the device in its Unrolled State, being held by the user's both hands, the Touchpad Keyboards attached, the Removable Earpiece in its Attached Position capable of supporting the Remote Control Mode, the Camera Module in its Retracted Position, the Viewfinder assembly in its Retracted Position.
Figure 2:
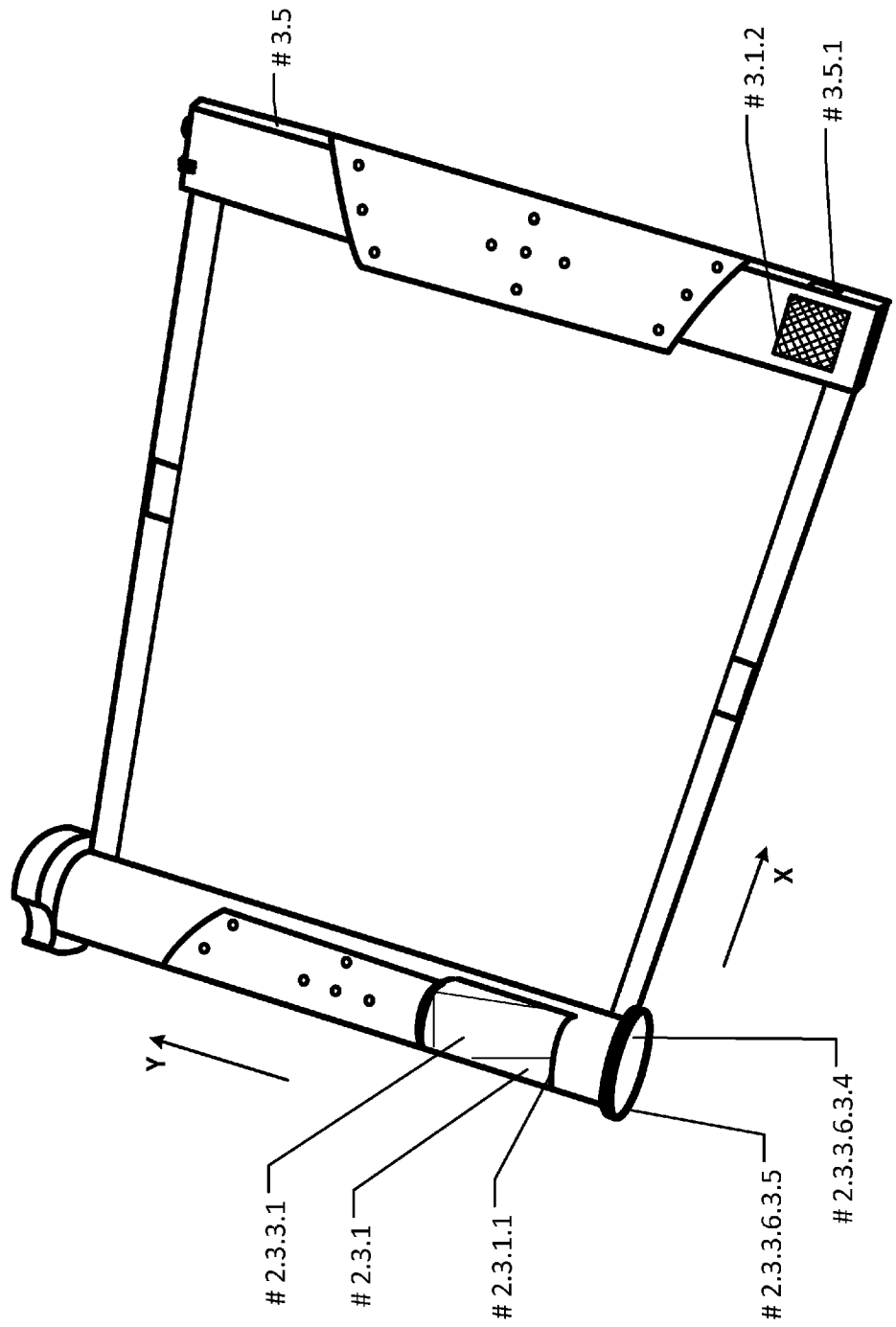
FIG. 2 shows a front view of the device in its Unrolled State, the Touchpad Keyboards attached, the Removable Earpiece in its Attached Position capable of supporting the Remote Control Mode, the Camera Module in its Retracted Position, the Viewfinder assembly in its Retracted Position.
Figure 3:
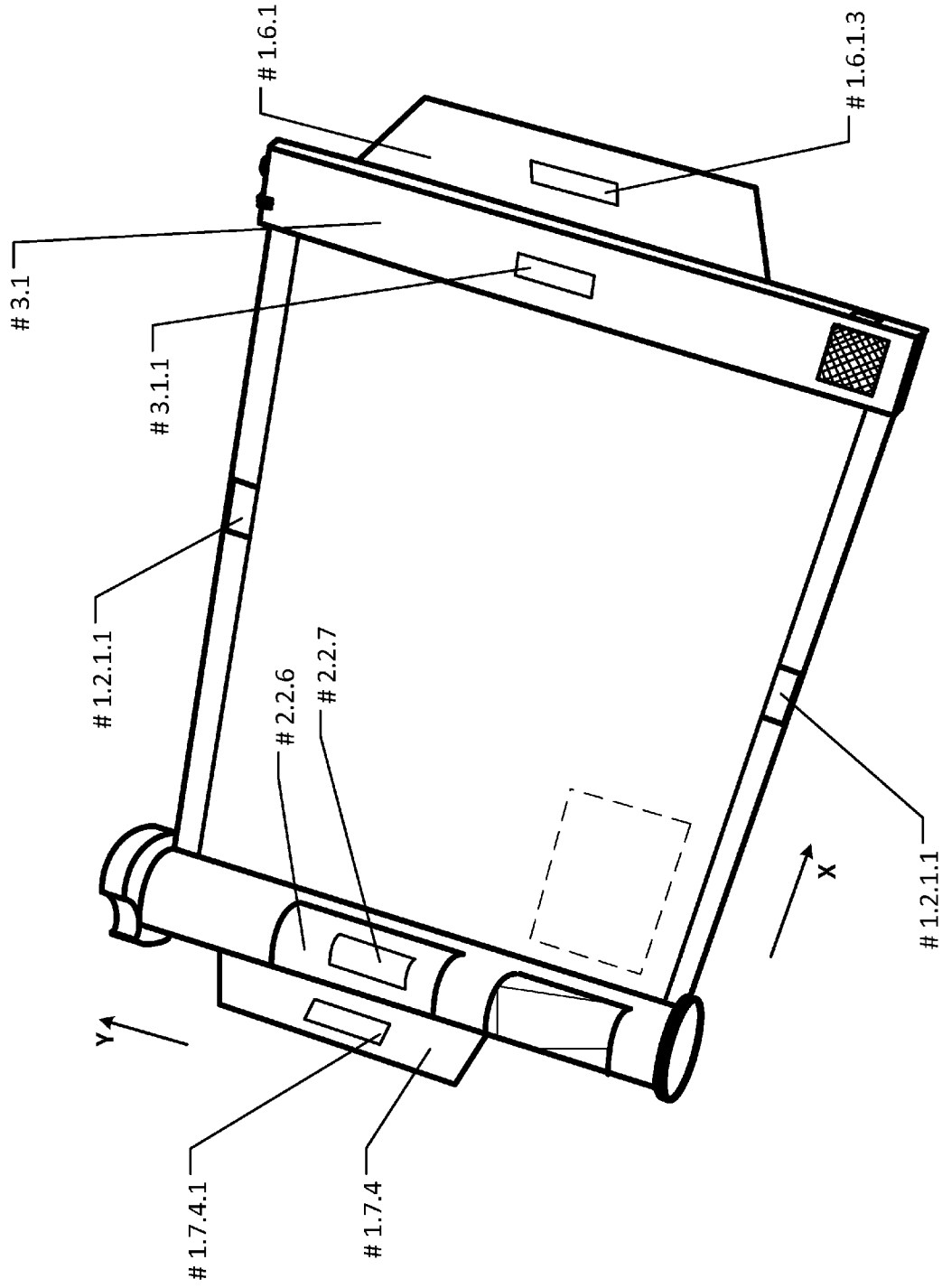
FIG. 3 shows a front view of the device in its Unrolled State, the Touchpad Keyboards attached to the device with their side flaps detached from the device, the Removable Earpiece in its Attached Position capable of supporting the Remote Control Mode, the Camera Module in its Retracted Position, the Viewfinder assembly in its Retracted Position.
Figure 5:
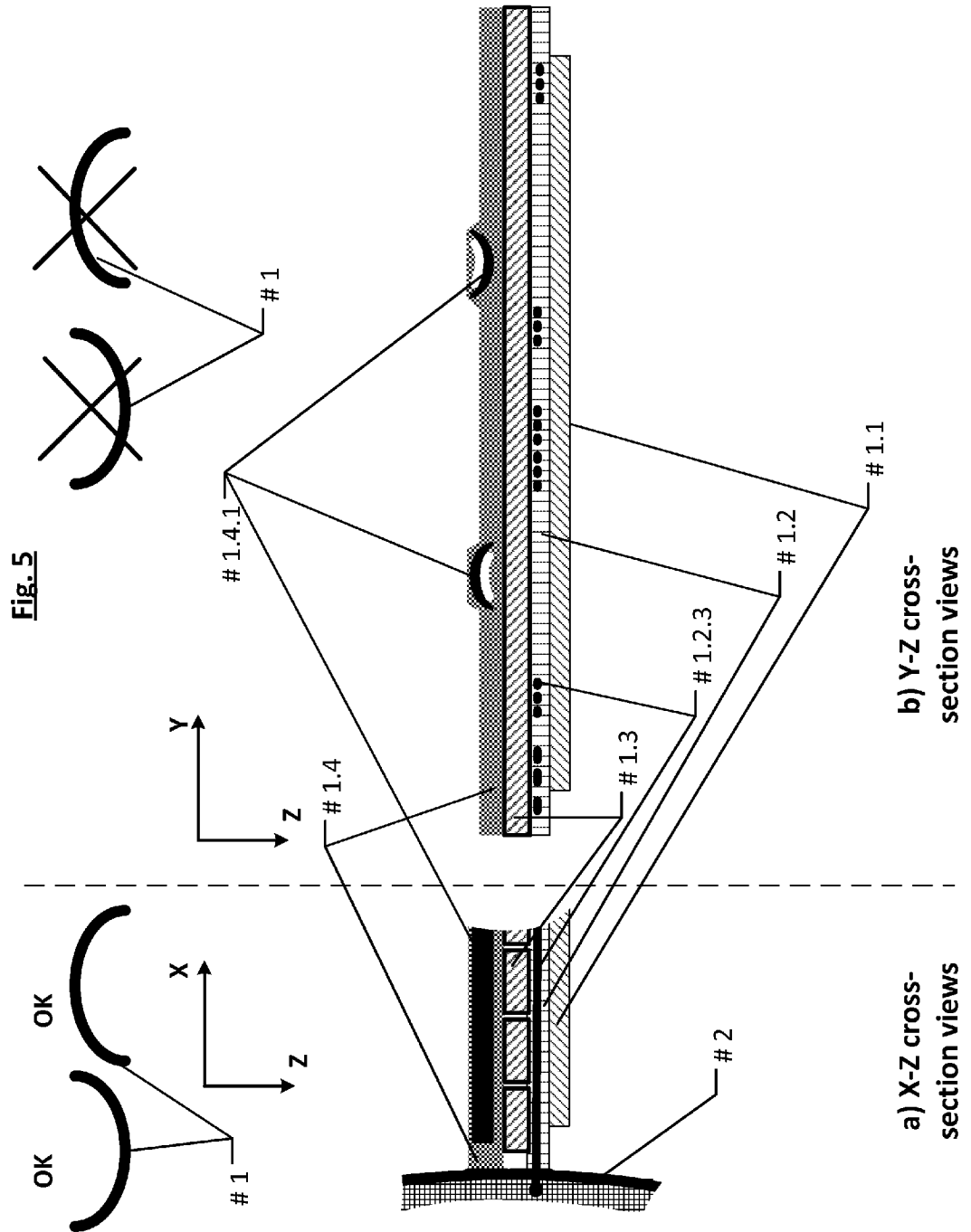
FIG. 5 shows two cross-section views of the Roll component of the device which is in its Unrolled Statea, without the Touchpad Keyboards, together with a partial cross-section view of the attached Core Module, and four schematic images explaining which directions of bending of the Roll component are possible and which are not.
Figure 6:
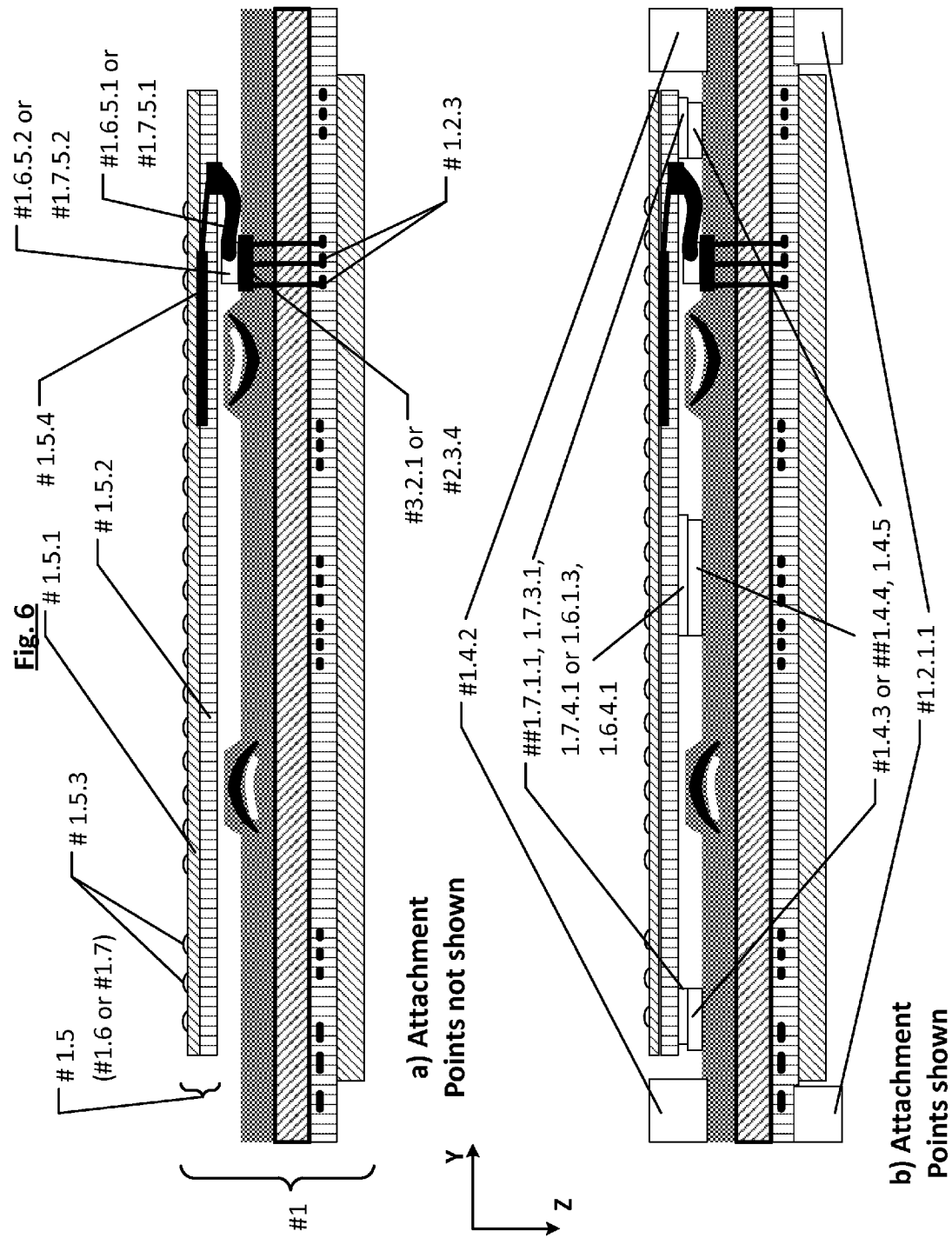
FIG. 6 shows two cross-section views of the Roll component of the device with a Touchpad Keyboard attached, one of the views (b) in addition includes the appropriate visible Attachment Points.

The Flexible Display (#1.1) is attached to supporting substrate called Flexible Base (#1.2) as shown on FIGS. 1, 5 and 6. The layered structure of the Roll (#1) component is explained via 4 separate cross sections on FIGS. 5 and 6. The permanent (or, under certain design variants, semi-permanent) attachment of the layers to each other will be made strong enough to withstand numerous bending-flattening cycles during the device's useful life.

The whole Roll (#1) component is designed to take flat shape when released and to be able to bend in two directions (or at least in one with the display surface being bent inward) along the single axis. The four schematic images placed in the upper part of FIG. 5 explain in which directions the Roll (#1) component is bendable and in which is rigid. This rigidity (i.e. prevention of bending along the axis perpendicular to the one mentioned above) is achieved by attaching a plurality of flat, narrow and rigid components called Rigidity Bars (#1.3) to the back side of the Flexible Base (#1.2), as shown on FIGS. 5 and 6. They will be made narrow enough and thin enough to allow bending of the Roll (#1) in the allowed directions with the curve radius small enough for the component to be able to be rolled around the cylindrical Core Module (#2). At the same time they will be made long enough and rigid enough to prevent bending of the component in any of the forbidden directions over certain reasonable limit, even if a reasonable amount of force is applied. Note: in the three previous statements, the "flat" and "thin" characteristics apply to a component's dimension measured along the Z axis, "narrow"—X axis and "long"—Y axis, as shown on FIG. 5. The purpose of these rigidity properties of the Roll (#1) component is to maintain the Flexible Display (#1.1) flat enough for undistorted viewing and precise touch screen operation, when the device is in its Unrolled, Desktop Unrolled or Half-rolled State.

To achieve the Roll (#1) component taking flat shape when released (i.e. in the absence of an external bending or rolling force applied typically by the user's hand or hands and exceeding certain reasonable threshold), a plurality of components called Flattening Bands (#1.4.1) is attached at the opposite side of the Rigidity Bars (#1.3), arranged perpendicular to the latter ones, as shown on FIG. 5. The shape and physical properties of each Flattening Band are similar to those of a cut of a common measuring tape. At least one Flattening Band from the plurality will be arranged with its concave side facing the Flexible Display (#1.1) and at least one—with its concave side facing the opposite direction. Such arrangement provides self-flattening effect for both bending directions—i.e. it forces the Roll (#1) component to return to flat shape no matter in which of the two directions it has been bent—either with the display surface bent inward or outward. Note: the Rolled and Half-rolled States shown on the FIGS. 12,13,14,15,16,17,18 presume the Roll (#1) component is bent and rolled with the display surface bent inward. However, bending and rolling in the opposite direction (with the display surface bent outward) may be possible under the same device configuration described herein, for some special applications not described. On the other hand, the Rigidity Bars (#1.3) may be made thicker in order to prevent the Roll (#1) component from such "outward" bending or rolling. In such case, one or more of the Flattening Bands (#1.4.1) should be arranged with the same orientation (with their concave side facing direction opposing the Flexible Display (#1.1)).

The described flattening effect is achieved if the Flattening Bands (#1.4.1) are constantly pressed against the perpendicular Rigidity Bars (#1.3). The component responsible is the Back Cover (#1.4) which will be made from an elastic but strong material similar to a duct tape. Elasticity is required to accommodate for both the Flattening Bands (#1.4.1) changing their shape from bent to flat, and the Rigidity Bars (#1.3) changing their relative positions with spaces between them increasing at one side—as the device is being rolled to be converted from its Unrolled or Desktop Unrolled State into either Half-rolled or Rolled State. The cross-section views of the Back Cover (#1.4) component on the FIGS. 5 and 6 show that it may contain internal hollow spaces along each Flattening Band to accommodate for the changing shape (i.e. flattening and reverse change) of the latter. Each Flattening Band will be subject to wear and tear more than other components of the device and can be irreversibly bent out of shape if the bending curve radius is too small, so the Back Cover (#1.4) may attach the Flattening Bands (#1.4.1) in a semi-permanent manner and have openings (not shown) in order for the user or repair specialist to be able to replace a damaged Flattening Band.

As shown on FIGS. 5 and 6, the Flexible Base (#1.2) component will comprise a plurality of flexible Embedded Wires (#1.2.3) having flat or oval shape in the cross-section. Most of the wires will be arranged parallel to the Flattening Bands (#1.4.1) and perpendicular to the Rigidity Bars (#1.3). They will provide electrical connection between electronic components placed within the Core Module (#2), the electronic components placed within the Outer Module (#3), the Flexible Display (#1.1) and the two Touchpad Keyboard electrical Connectors (#2.3.4 and #3.2.1) attached to the back surface of the Back Cover (#1.4) as shown on FIG. 6. In particular, this Figure shows that the Touchpad Keyboard electrical Connectors (#2.3.4 and #3.2.1) are connected to the Embedded Wires (#1.2.3) by conductors passing through the Back Cover (#1.4) and through (or between) one or more Rigidity Bars (#1.3).

Note: alternatively, the two Touchpad Keyboard electrical Connectors (namely the Inner Touchpad Keyboard Connector (Device part) (#2.3.4) and the Outer Touchpad Keyboard Connector (Device part) (#3.2.1)) may be attached to casing(s) of one or two modules: the Core Module (#2) and/or the Outer Module (#3), without connection to the Embedded Wires (#1.2.3). These variants are not shown on any Figure.

Attachment of both the Core Module (#2) and the Outer Module (#3) to the appropriate components of the Roll (#1)—to the Flexible Base (#1.2) and/or the Embedded Wires (#1.2.3) and/or the Back Cover (#1.4)—can be made permanent or semi-permanent to allow easier replacement of a component for repair or upgrade.

Figure 7:
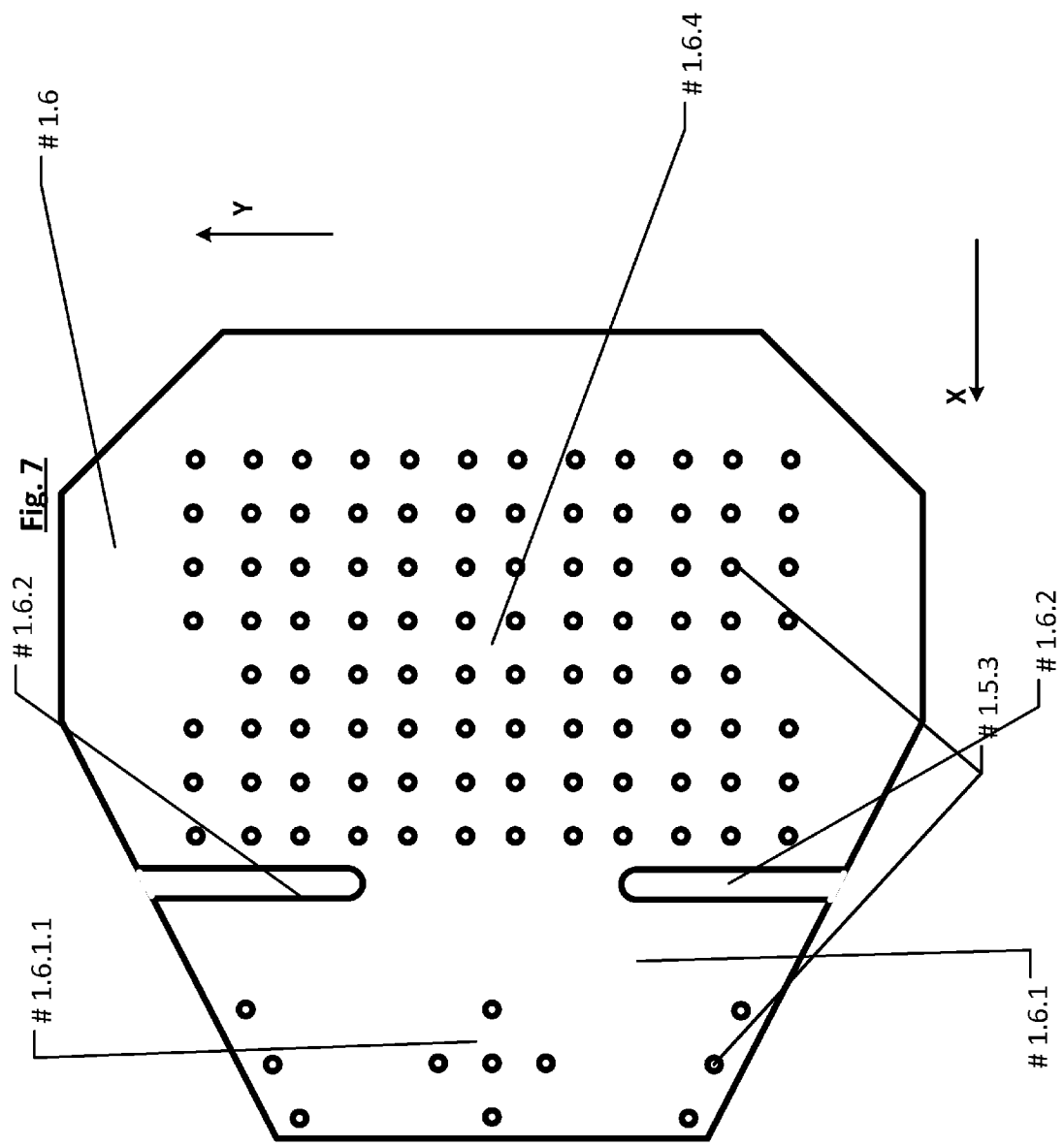
FIG. 7 shows the front (working) surface of the Outer Touchpad Keyboard detached from the host device and flattened.
Figure 8:
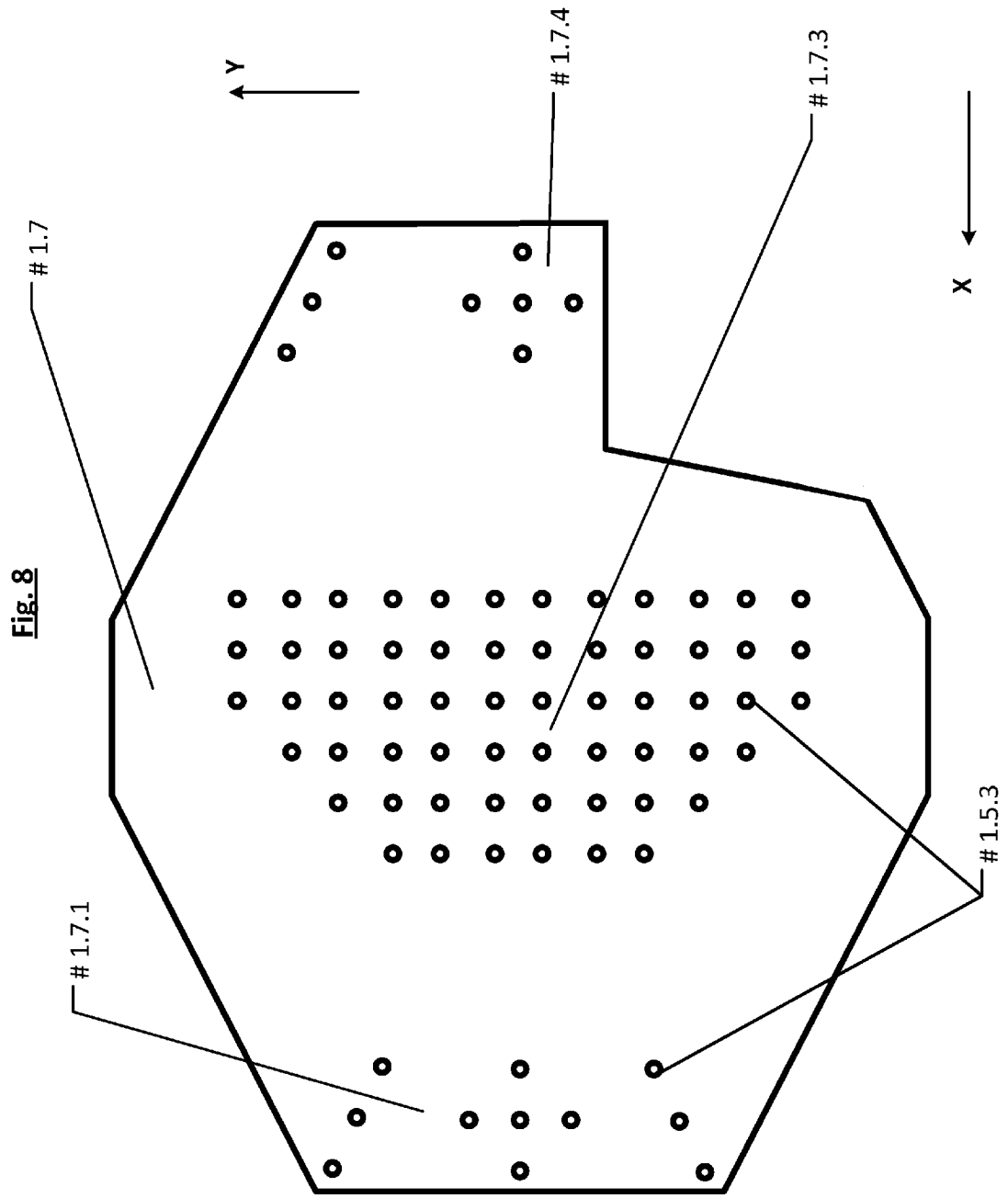
FIG. 8 shows the front (working) surface of the Inner Touchpad Keyboard detached from the host device and flattened.
Figure 9:
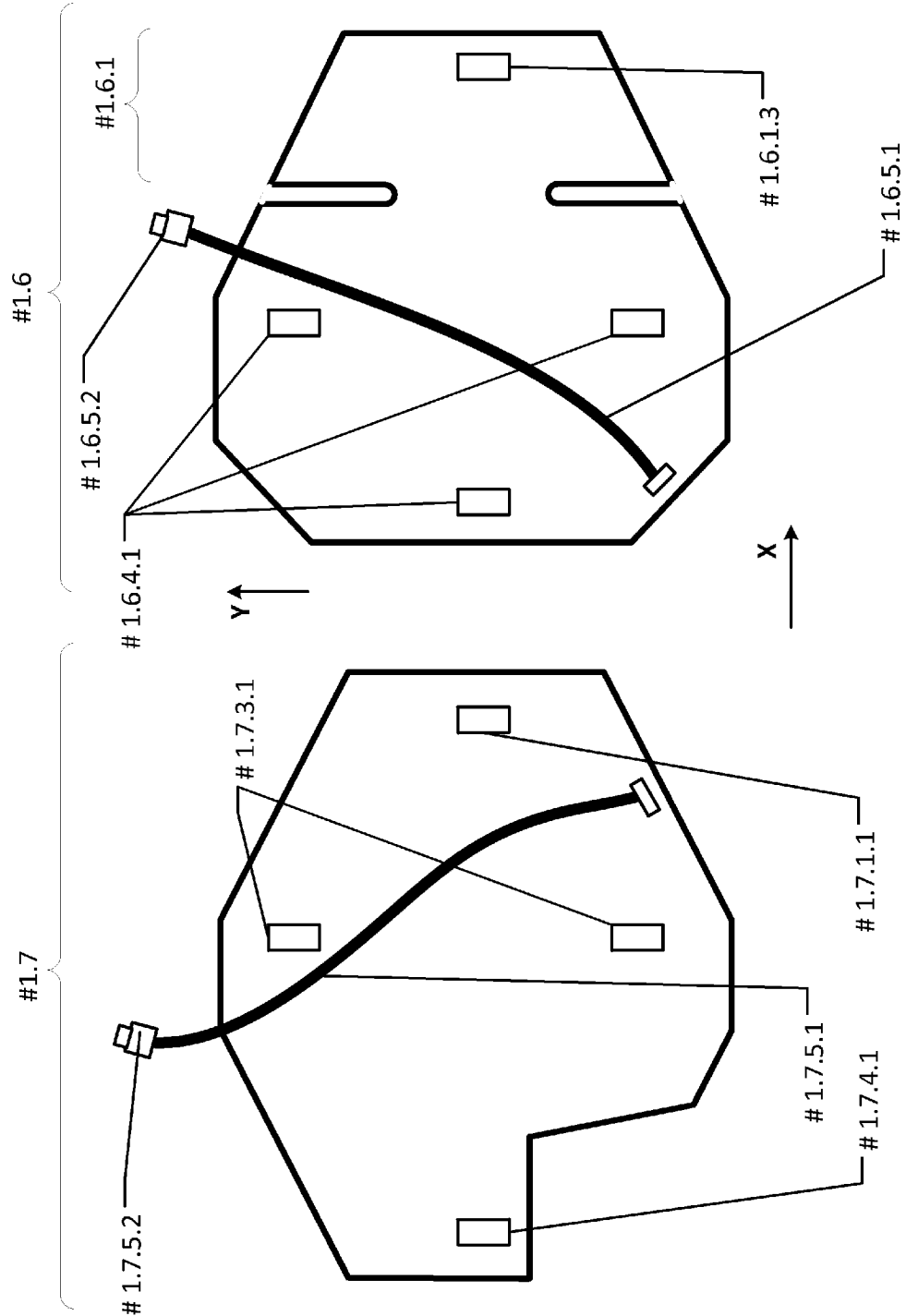
FIG. 9 shows the rear surfaces of the two Touchpad Keyboards detached from the host device and flattened.

The device comprises two detachable Touchpad Keyboard units called the Outer Touchpad Keyboard (#1.6) and the Inner Touchpad Keyboard (#1.7). They share the same principle and components but differ in size and shape, as shown on FIGS. 6,7 and 8. Each unit can function as a keyboard with the surface sensitive to single-finger and multi-finger touches and thus, combined with appropriate algorithm(s), software and/or method(s), it enables typing in a so-called blind mode (i.e. without the necessity for a user to look at the fingers). Application of this keyboard device may require installation of certain software (instructions for presenting on the visual display finger touches on the keyboard touchpad surface superimposed over an image of a virtual keyboard). Such touch-sensitive surfaces allow the units to perform the functions of a common touchpad found in laptops or in specialized touchpad devices. In addition to the touch-sensitive surface, each unit comprises a plurality of the "keys' called Relief Points (#1.5.3) which have the following functions:

1) Shaped as protrusions, they provide tactile feedback helping the user to position one or more fingertips onto correct 'keys' without looking at them;

2) Provide tactile "feels like a mechanical button" feedback when the user presses one or more 'keys'; 3) a micro switch, a pair of contacts or a pressure sensor contained within each component may generate electrical signal appropriate to the pressed 'key'. This signal is interpreted by the device processor or other electronic components and combined with the signals supplied by the Layer Comprising Touch-sensitive Surface (#1.5.2) to determine which one (or more) of the plurality of virtual keys being displayed to the user has been chosen and "pressed".

Only certain parts of the surface of each Touchpad Keyboard unit may be touch-sensitive. Some of the Relief Points (#1.5.3) not surrounded by a touch-sensitive surface may be used as common buttons—especially those intended primarily for a thumb operation and placed on one of the three Thumb Keypad components of the two units:

Outer Thumb Keypad (#1.6.1.1)

Inner thumb Keypad for Unrolled State (#1.7.4)

Inner thumb Keypad for Half-rolled State (#1.7.1)

To prevent accidental/unwanted activation of keys, each Touchpad Keyboard unit may be equipped with an auto-lock function and method which would make the Relief Points (#1.5.3) inactive until certain type or pattern of touches or gestures is applied by the user's finger or fingers on the touch-sensitive surface area or areas of the unit, indicating the user's intention to operate the keyboard. Another auto-lock method may be based on recognition of the event that a certain set or a certain number of Relief Points (#1.5.3) have been pressed or flattened while the device is being converted (rolled) into its Half-rolled or Rolled State and thus some portions of one or two Touchpad Keyboards have become unsuitable for finger operation and must be de-activated.

Figure 4:
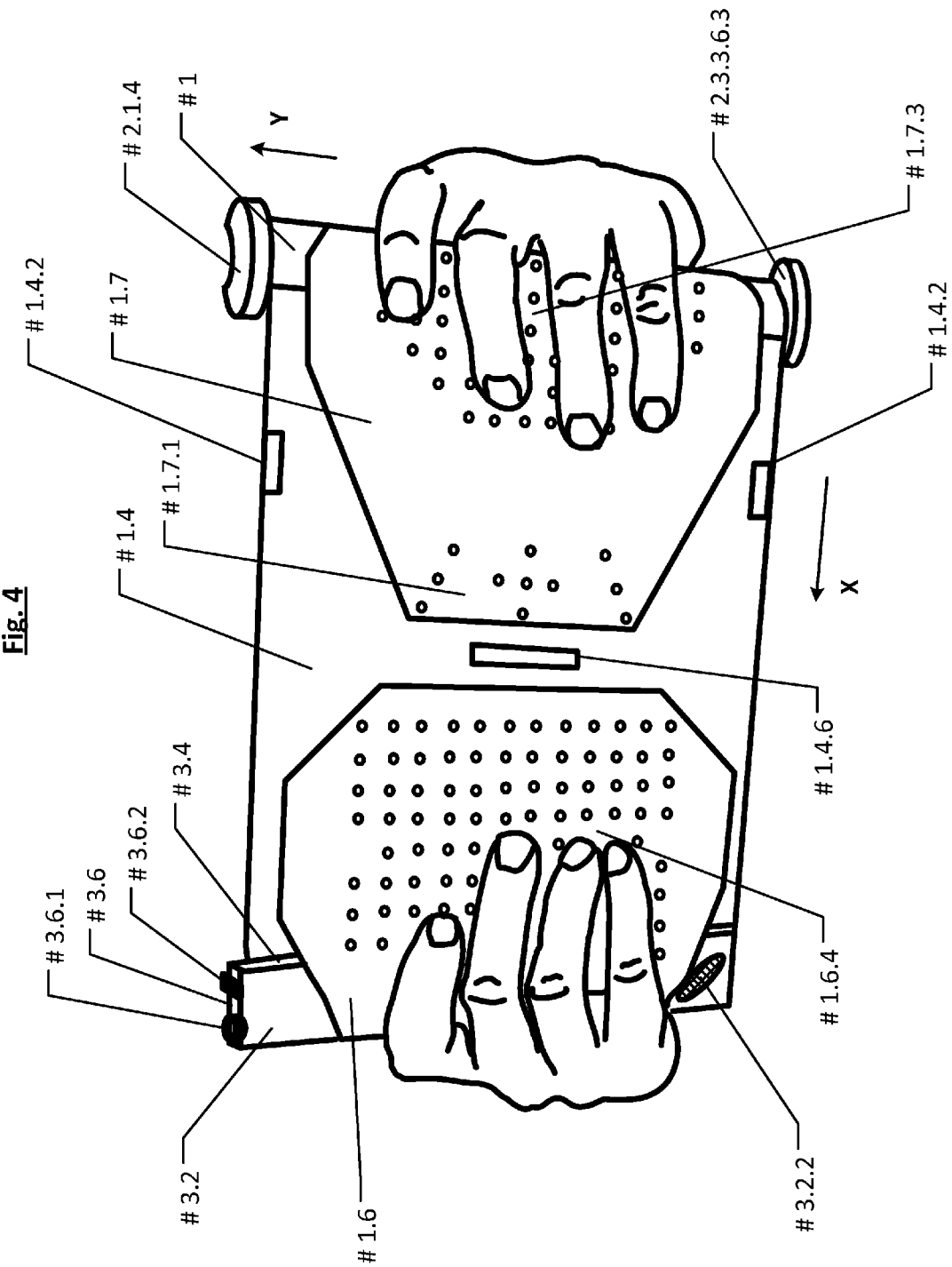
FIG. 4 shows a back view of the device in its Unrolled State, being held by the user's both hands arranged in a position suitable for text typing or other multi-key interaction with the device, with the Touchpad Keyboards attached, the Removable Earpiece in its Attached Position capable of supporting the Remote Control Mode, the Camera Module in its Retracted Position, the Viewfinder assembly in its Retracted Position.

As shown on FIG. 4, in the Unrolled State both Touchpad Keyboards may be used at the same time for two-hands operation. The user may touch the Outer Touchpad Keyboard (#1.6) with the fingers of the right hand and touch the Inner Touchpad Keyboard (#1.7) with the fingers of the left hand. Note that an area of each unit located closer to the center of the Roll (#1) component cannot be reached by any finger and therefore is not used in this State.

Temporary, reversible attachment of each of the Touchpad Keyboard units to the host device is performed by the coupling pairs of components called the Attachment Points. See FIG. 6(b) for multiple examples of Attachment Points. These components may be implemented as magnets, Velcro patches or other type fasteners. They may also possess elastic properties to be able to maintain coupling even when the Roll (#1) component is being bent. Similar Attachment Points may be used, together with certain parts (the flaps shown on FIG. 3) of the Touchpad Keyboard Units hosting the said Attachment Points, to hold the device in its Half-rolled or Rolled State (see FIGS. 3,4, 6b, 9, 17 as well as the Appendix to the Specification for more details).

The Removable Earpiece (#2.1.4) unit is designed to perform functions of either a wireless earpiece, a remote control, or a wireless mouse (typically, the last Mode is used when the host device is in its Unrolled Desktop State—see Paragraph 2.2 below). Unlike separate accessories, this unit provides benefits of conveniently being always at hand, never being lost or misplaced and never requiring the user to carry additional chargers, pouches etc.

It is shown attached to the host device on FIGS. 1,2,3 and 4. In such Position, it can be used to support the Remote Control Mode. Its Infrared Emitter (#2.1.4.1.3) component will be sending infrared signals to control other devices. As a variation of this Mode, the Removable Earpiece (#2.1.4) unit may be detached from the host device and placed in a location suitable for establishing infrared communication with other devices, while the host device is controlling the unit via uni-directional or bi-directional radio channel. Also, the "backward remote" mode may be possible with the user operating the Thumbwheel (#2.1.4.1.2), the Buttons (#2.1.4.1.1) or other controls comprised in the unit in order to remotely control functions of the host device the unit is detached from.

Figure 10:
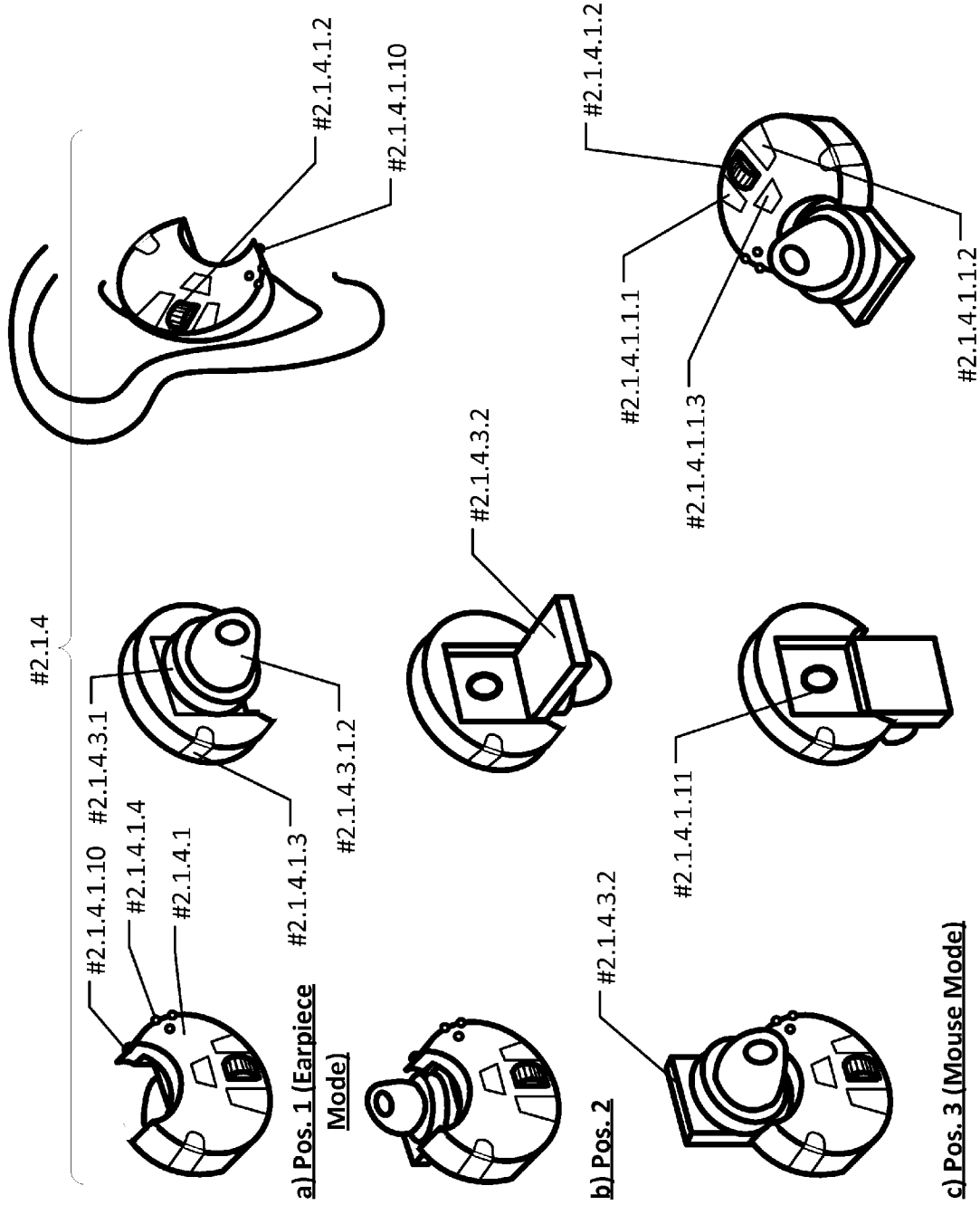
FIG. 10 shows the three consecutive Positions of the Removable Earpiece detached from the host device as its being converted from the Earpiece Mode (a) into the Mouse Mode (b).

The unit is shown as a standalone device to be connected wirelessly to the host device in multiple Positions and Views on FIG. 10. The three views on FIG. 10(a) show the unit in the Position to support its primary Mode—the Wireless Earpiece Mode. In this Mode, the unit performs like most existing wireless earpiece devices. Its Thumbwheel (#2.1.4.1.2) control can be used for selecting a menu command being read via a voice prompt, to adjust volume etc.

2.2 Desktop Unrolled State

Figure 11:
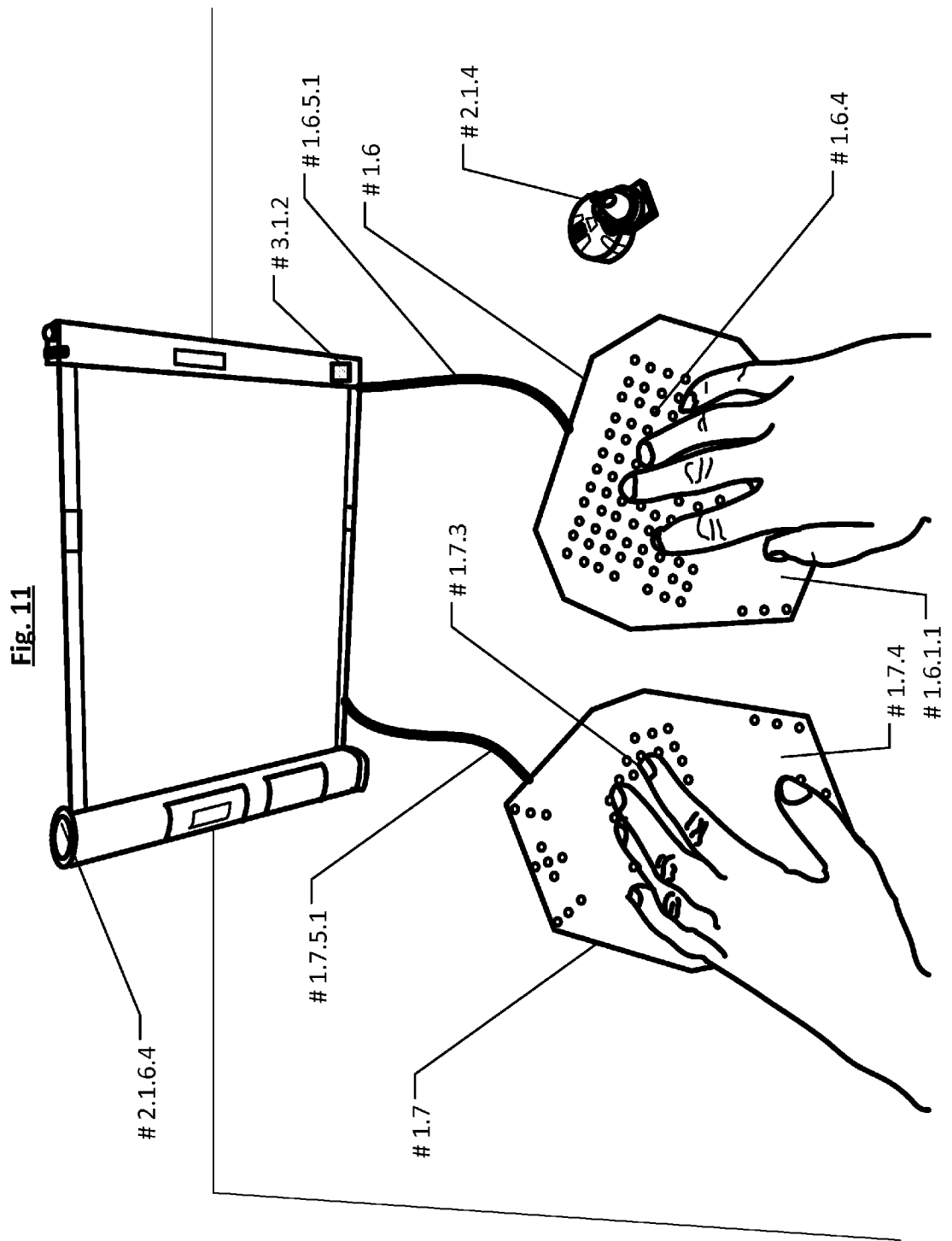
FIG. 11 shows a view from above of the device in its Desktop Unrolled State placed on a desktop together with detached Removable Earpiece unit supporting the Mouse Mode, with the Touchpad Keyboards detached but connected to the host device via the two cables, both Touchpad Keyboards placed flat on the desktop surface under user's hands for convenient typing operation.
Figure 12:
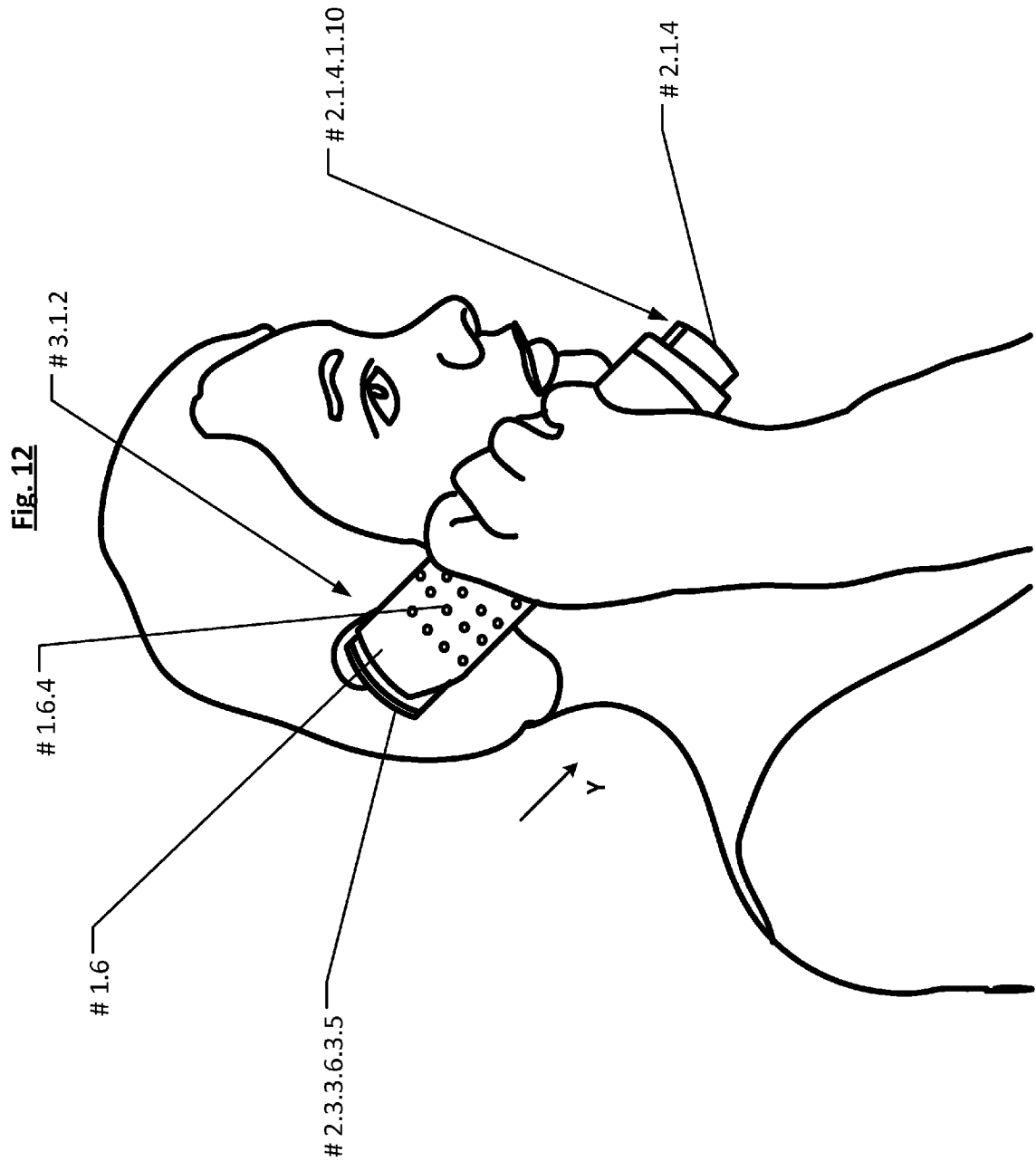
FIG. 12 shows the device in its Rolled State being held with a single user's hand during a phone conversation, with the Touchpad Keyboards attached, the Removable Earpiece in its Attached Position supporting the Voice Capture Mode, the Camera Module in its Retracted Position, the Viewfinder assembly in its Retracted Position capable of supporting the Projection Screen Mode.

In this State, shown on FIG. 11, the device resembles a common laptop or desktop PC in its functions and handling. However, it may surpass these existing devices in typing convenience and efficiency, allowing a single (uni-body) keyboard to be replaced by two separate Touchpad Keyboard units operated with single hand each and placed at a maximally comfortable, customized distance from each other, at the same time each one having most comfortable orientation. These units eliminate the need for the user to look at the fingers or keys (as when operating a PC mouse), thus minimizing both the hand strain (from unnatural arms bending to adjust user's body to a rectangular operational area of a common keyboard usually being substantially narrower than the user's shoulders) and the eyestrain (from the necessity to constantly move the eyes' focus point from the keyboard to the display and back).

As it can be seen on the FIG. 11, the areas of both Touchpad Keyboards dedicated for thumb operation—namely the Outer Thumb Keypad (#1.6.1.1) belonging to the Outer Touchpad Keyboard (#1.6), and the Inner thumb Keypad for Unrolled State (#1.7.4) belonging to the Inner Touchpad Keyboard (#1.7), can be still used for thumb typing or control in this State.

Wireless connection between each of the Touchpad Keyboard units and the host device is possible as a variant but requires batteries, radio or infrared circuits/sensors—and this additional hardware and data communication protocols may eventually make operation less convenient and/or reliable. The present Specification shows a wired variant with two cables and electrical connectors being used. These components are shown on FIGS. 6,9 and 11. The cables will be made long enough to support convenient operation in the Desktop Unrolled State (see FIG. 11). The cables will be also made flat enough to be placed conveniently into the space between the Touchpad Keyboards and the Back Cover (#1.4) when the Touchpad Keyboards are attached to the host device, as shown on FIG. 6.

As the Removable Earpiece (#2.1.4) unit is being converted from Earpiece Mode into Mouse Mode (the process is shown in three stages on FIGS. 10(a) through (c)), its part called Flat Body (#2.1.4.3.2), together with the Earhorn (#2.1.4.3.1.2) is flipped at approximately 180 degrees to provide more convenient mouse operation and prevent the latter component from contamination from the desk surface. The controls located on the top side of the Removable Earpiece (#2.1.4) converted into a mouse—the two or three Button (#2.1.4.1.1.) and the Thumbwheel (#2.1.4.1.2)—will be used in the same way as controls of a common mouse.

In this State, the Fixture Rod (#3.7) located at the back of the device can be used as a kickstand to hold the device in an inclined position. This component is connected either to the Outer Module (#3) or the Core Module (#2) via its Ball-type pivot joint (#3.7.1) which provides wide variety of possible relative positions of the two attached components.

2.3 Rolled State

Figure 13:
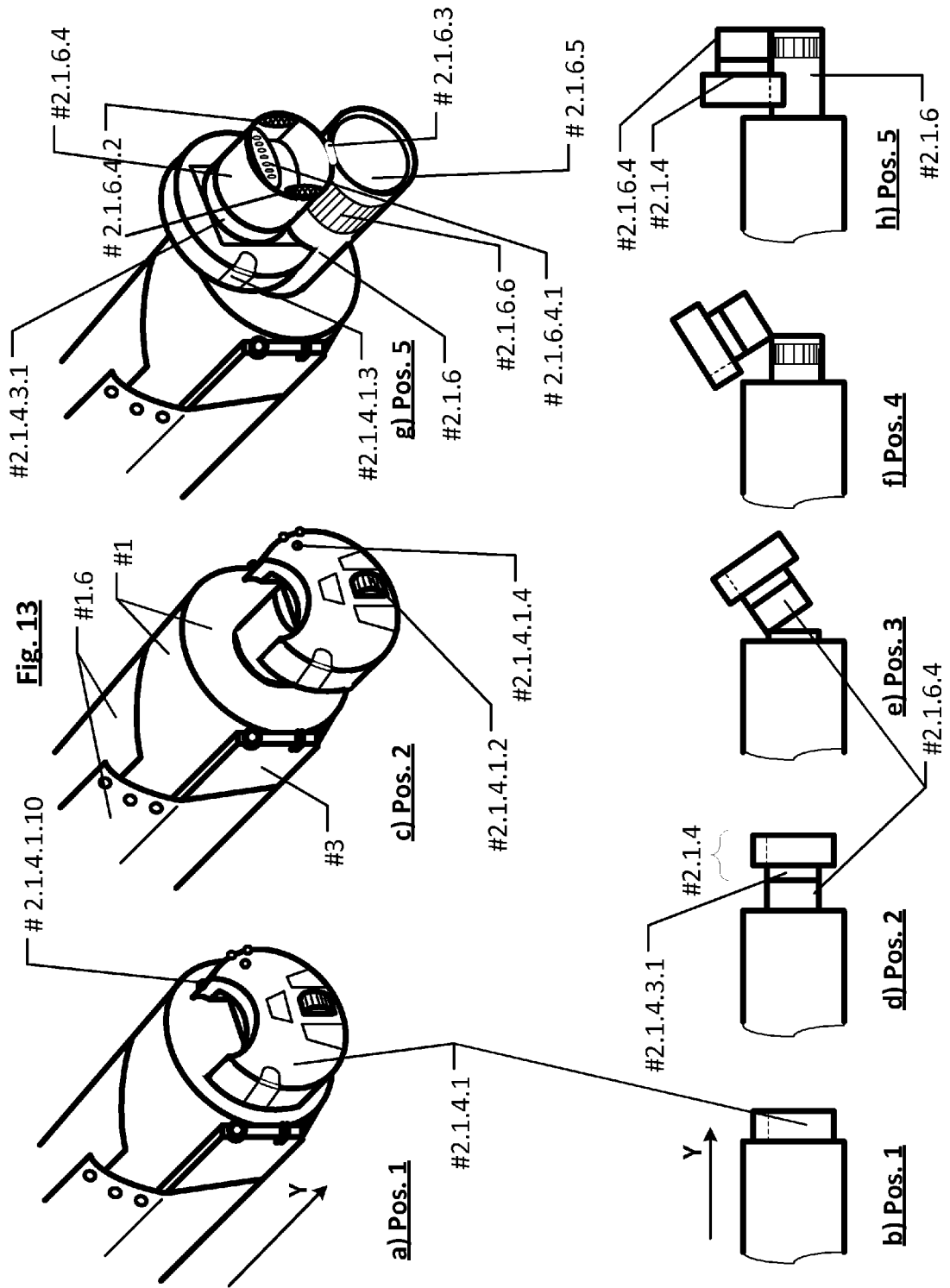
FIG. 13 shows the five consecutive Positions of the Camera Module with the Removable Earpiece attached to its Cap as the Camera Module is being converted from the Retracted Position to the Partially Extended Position, the latter supporting photo or video shooting mode.
Figure 14:
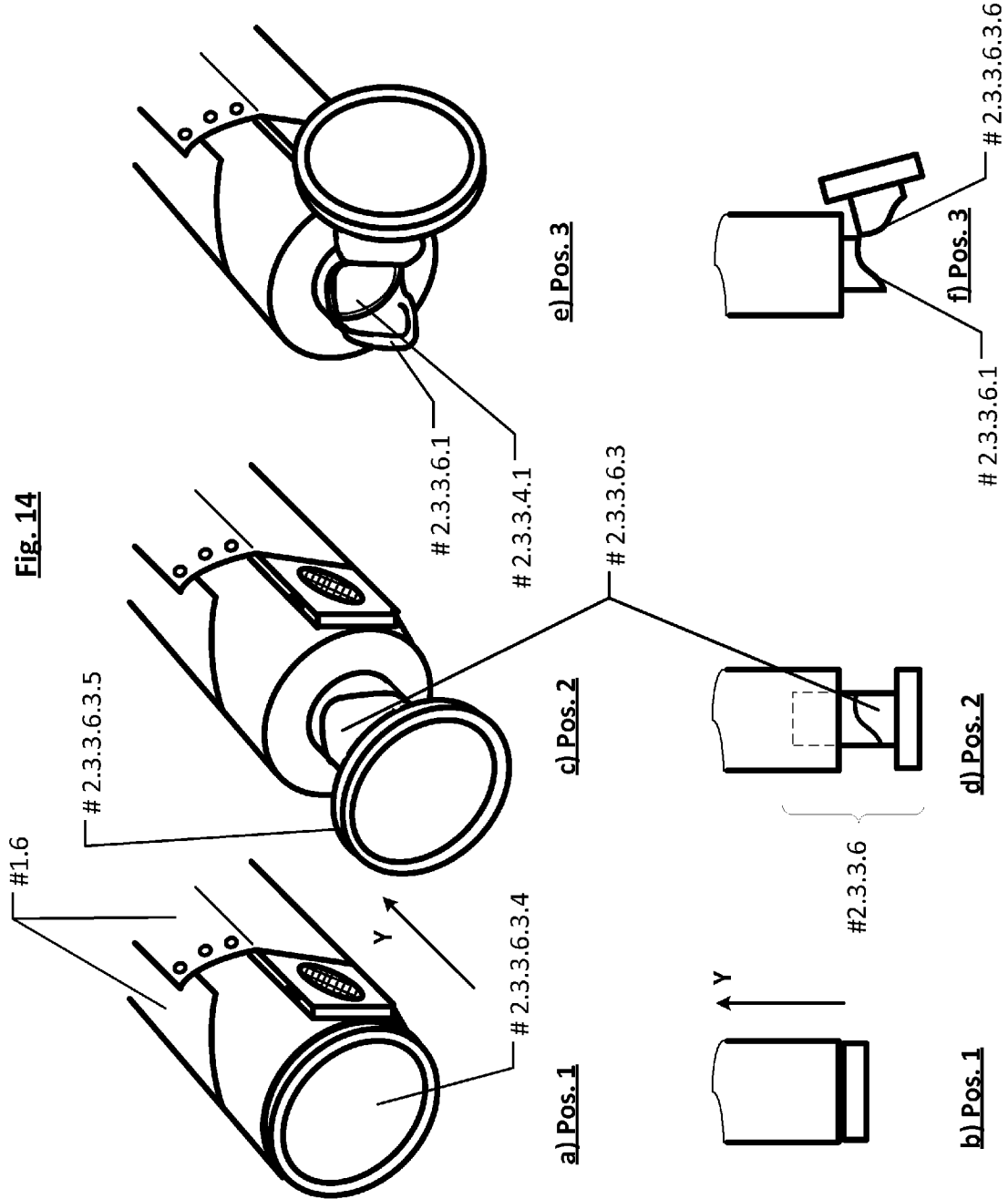
FIG. 14 shows the three consecutive Positions of the Viewfinder assembly as it is being converted from the Retracted Position supporting the Projection Screen mode to the "Viewfinder Extended, Cap Open" Position supporting the Viewfinder Display mode for photo or video shooting etc.
Figure 15:
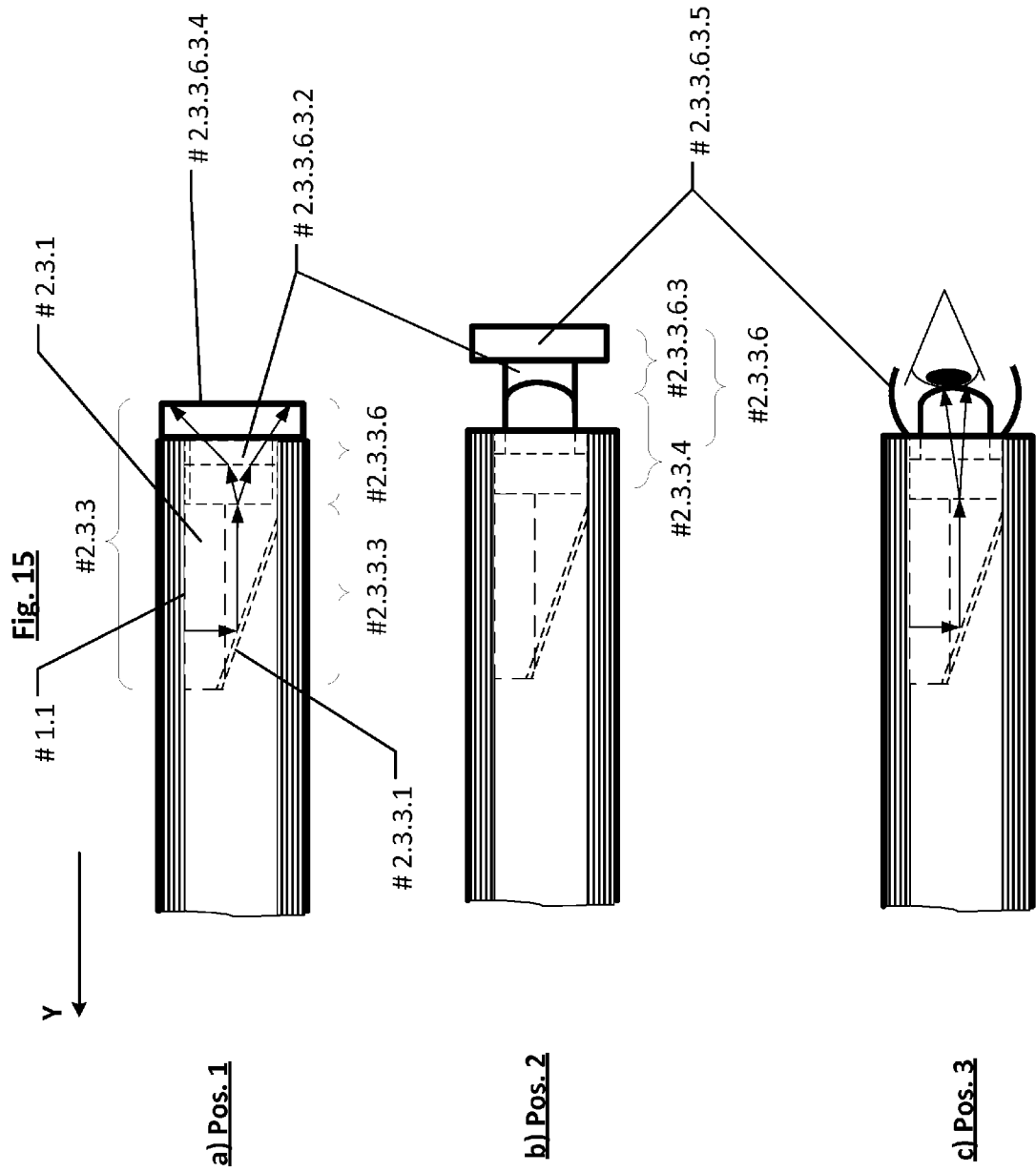
FIG. 15 shows the three consecutive Positions of the Viewfinder assembly as it is being converted from the Retracted Position supporting the Projection Screen Mode to the "Viewfinder Extended, Cap Open" Position supporting the Viewfinder Display mode, with participating internal and external components and the optical paths schematically shown.

In this State, shown completely on FIGS. 11, 16 and partially on FIGS. 13,14 and 15, the device is converted to its most compact, cylindrical shape suitable for wearing attached to a waist belt, a bag's belt, a pocket etc. This State is suitable for applications requiring fast device preparation and engagement and comfortable handling while the user is on the go—such as cellular phone, wireless landline phone (requires interaction with a base station via a protocol such as DECT, Wi-Fi or Bluetooth), camera, remote control or audio player applications. The shape and diameter of the device in this State allows convenient holding and operation with one hand when the device is used as a phone for talking and as a camera for photo and video shooting, as shown on FIGS. 11 and 16 respectively.

For the phone application, the Removable Earpiece (#2.1.4) can also be removed from the host device while the latter is worn on a waist belt or carried inside or attached to a bag, and re-attached to the host device when conversation is over. This way the risk of this small unit being lost or misplaced is decreased. The host device can also maintain optimal charge level for the unit's internal battery at all times.

If the user chooses not to detach the Removable Earpiece (#2.1.4) for a phone call, the whole device will be used as a mobile phone, as shown on FIG. 11. The Earphone Grid (#3.2.2) located at the back side of the Outer Module (#3) will be placed against user's ear. (This component is hidden on FIG. 11 but is visible on FIGS. 4 and 18). For a microphone capturing user's voice the Voice Microphone (#2.1.4.1.10) of the now-attached Removable Earpiece (#2.1.4) can be used (see FIG. 11).

The device may also feature a special mode of three-way conversation when two users participate in a phone or network call at one side of the line, the first user talking via the Removable Earpiece (#2.1.4) detached from the host device and the second user operating the host device in a manner shown on FIG. 11, only with the Stereo Microphone (#2.1.6.4.2) (located within the now-closed Camera Cap (#2.1.6.4) of the Camera Module (#2.1.6) and communicating with the outside space via an opening on the outer side of the Camera Cap (#2.1.6.4)—see FIG. 13(g)) being used by the second user instead of the Voice Microphone (#2.1.4.1.10) of the Removable Earpiece (#2.1.4).

Controlling the phone functions can be performed via the Outer Touchpad Keyboard wrapped around the device (see FIG. 11).

Ad-hoc information (such as the phone number, the calling party name, etc.) the user may require before, during or after phone call will be displayed on the Round Screen (#2.3.3.6.3.4) located at the side of the device opposite to the side when the Removable Earpiece (#2.1.4) is attached. In the phone call position shown on FIG. 11, the Round Screen (#2.3.3.6.3.4) is in its Retracted Position, located on top of the device and therefore convenient for quick viewing.

The Round Screen (#2.3.3.6.3.4) implementation described herein utilizes the light projection principle with the source of light being a specific area (portion) of the main Flexible Display (#1.1) which in this State is rolled with its surface bent inwards and therefore not visible to the user. The light projection from the source (the area of the Flexible Display (#1.1) shown schematically with rough approximation by the dashed line on FIG. 2) to the target (either the Round Screen (#2.3.3.6.3.4) or the Viewfinder (#2.3.3.6)) is performed by the cylinder-shaped Projection Module (#2.3.3) located within the Core Module (#2) which is also cylinder-shaped. Some of the internal and external components of the Projection Module (#2.3.3) are shown for the Rolled state on FIGS. 14 and 15 but others are visible only when the device is in its Unrolled or Desktop Unrolled State and are thus shown on FIGS. 2 and 3 for the Unrolled State (in this State the Projection Module (#2.3.3), the Round Screen (#2.3.3.6.3.4) and the Viewfinder (#2.3.3.6) cannot be used). In the Rolled State the specific area (portion) of the main Flexible Display (#1.1) displaying appropriately software-processed (possibly including increasing the brightness) images is wrapped over the transparent Window (#2.3.1) which is located at the surface of the Core Module (#2) and framed by the soft Light Blocking Gasket (#2.3.1.1) to prevent side light from blending with the images. Then, as shown on FIG. 15, the light from the images passes through the Window (#2.3.1) into the Light Chamber and is reflected by the Mirror (#2.3.3.1) into the Optical System 1 (#2.3.3.4) which corrects distortion and directs the light to the Optical System 2 (#2.3.3.6.3.2) which projects and focuses the images on the rear surface of the Round Screen (#2.3.3.6.3.4). Some of these components are shown also on FIG. 2 (in a non-working state).

For a camera application, the device, while staying in its Rolled State, needs to undergo conversion when both the Camera Module (#2.1.6) and the Viewfinder (#2.3.3.6) are extended and their caps flipped open. The subsequent stages of the conversion are shown on FIG. 13 for the Camera Module (#2.1.6) and on FIG. 14—for the Viewfinder (#2.3.3.6). This conversion can be performed quickly with minimum user intervention if two push-out springs on both sides of the cylindrical device body are released by a single latch—either via a mechanical control user presses or switches or an electromagnetically controlled mechanism. For such mechanical control mentioned above, the body of the Removable Earpiece (#2.1.4) may be used in the following manner: if the Removable Earpiece (#2.1.4) attached to the host device is turned at a certain angle counterclockwise, it releases both the Camera Module (#2.1.6) and the Viewfinder (#2.3.3.6) which are pushed out by the force of the two springs, extended out and their Caps flipped open by the force of the two hinge springs, exposing the Camera Lens (#2.1.6.5), the other camera sensors, flash etc. located on the inner side of the Camera Cap (#2.1.6.4), and the Viewfinder Lens (#2.3.3.4.1)—as shown on FIGS. 13 and 14 respectively. If the Removable Earpiece (#2.1.4) attached to the host device is turned at a certain angle clockwise, it is released itself and can be detached from the host device to be used in the Earpiece or Remote Control Mode. After that, the Camera Module (#2.1.6) and the Viewfinder (#2.3.3.6) can be released either via the user engaging a mechanical control placed on the outer side of the Camera Cap (#2.1.6.4) or electronically.

The Camera Module (#2.1.6) may operate in this Partially Extended Position (suitable for the Rolled State) both with the Removable Earpiece (#2.1.4) attached to its Camera Cap (#2.1.6.4) (as shown on FIGS. 13(g) and (h)) and alternatively with the Removable Earpiece (#2.1.4) detached. In the latter case, the Removable Earpiece (#2.1.4) may be used to control external flash devices remotely (via radio link with the host device), or it can be placed in user's ear for one or more of the following purposes:

controlling the shooting process via audio feedback, audible status messages etc.;
interacting with other applications while shooting takes place;
recording voice narration as an additional audio channel or mixed with the two primary channels.

As the Viewfinder (#2.3.3.6) converts from its Retracted Position to Open Position (see FIGS. 14 and 15), it slides out and then its Viewfinder Cap (#2.3.3.6.3) flips open at an angle of approximately 135 degrees to expose the Viewfinder Lens (#2.3.3.4.1) and the two parts forming together the Eyecup which provides comfort for user's eye and blocks (together with the Viewfinder Cap (#2.3.3.6.3) in its Open Position) any stray light coming from the sides. This viewfinder mode utilizes only the Optical System 1 (#2.3.3.4) but not the Optical System 2 (#2.3.3.6.3.2)—as shown on FIG. 15. The Optical System 1 (#2.3.3.4) is designed in such a way that it can properly focus the images for user's eye in the absence of the Optical System 2 (#2.3.3.6.3.2) while being capable to work together with the latter in the projection screen mode.

The Round Screen (#2.3.3.6.3.4) may also be used for camera applications if the user prefers to. In this case, the Viewfinder Cap (#2.3.3.6.3) is closed and the Viewfinder (#2.3.3.6) is retracted.

Both the Round Screen (#2.3.3.6.3.4) and the Viewfinder (#2.3.3.6) may be used for non-camera applications such as device status check and control, short messages or emails reading etc. Confidential information (or regular information in a bright sun environment) can be viewed by the user privately via the Viewfinder (#2.3.3.6).

Same as for the phone applications, controlling the camera functions can be performed via the Outer Touchpad Keyboard wrapped around the device (see FIG. 16).

In this State, the Fixture Rod (#3.7) located at the back of the device can be used as a mount for one Universal Clip (#3.7.5) or for two such components. The Universal Clip (#3.7.5) is primarily used for attaching its host device to trouser belts, clothing pockets, bag belts and pockets etc. The second Universal Clip (#3.7.5) may be used to secure the device in a more unstable environment where the risk of accidental detachment is high (for example, when the device is attached to a vertically positioned belt of a bag that is frequently moved). Each Universal Clip (#3.7.5) is connected to the Fixture Rod (#3.7) via a single Pivot Joint (#3.7.4) allowing 360 degrees rotation of the Universal Clip (#3.7.5) around an axis perpendicular to the main axis of the Core Module (#2), provided the Fixture Rod (#3.7) is secured in a specific position parallel to the Core Module (#2) at the back surface of the Outer Touchpad Keyboard (#1.6)—either via tightening of the Ball-type pivot joint (#3.7.1) or via attaching of the opposite end of the Fixture Rod (#3.7) to the Outer Fixator (#3.4.1). Besides rotation around a virtual axis passing through the Mounting Hole for a Pivot Joint (#3.7.5.1.2) of the Universal Clip (#3.7.5), the latter can be slided along the Fixture Rod (#3.7) to accommodate to a specific situation.

The Fixture Rod (#3.7) component is connected either to the Outer Module (#3) or to the Core Module (#2) via its Ball-type pivot joint (#3.7.1) which provides a wide variety of possible relative positions of the two attached components. If the Outer Touchpad Keyboard (#1.6) is to be detached from the host device or attached back, the Top-side opening for Fixture Rod (#1.6.2) will be used to let the Fixture Rod (#3.7) pass and the Bottom-side opening for Fixture Rod (#1.6.3) will be used to let the Outer Fixator (#3.4.1) pass (see FIG. 7).

The Universal Clip (#3.7.5) comprises a Long Band (#3.7.5.1), a Short Band (#3.7.5.2), a Long Band Magnet (#3.7.5.1.1), a Short Band Magnet (#3.7.5.2.1), a Fixed Clamp (#3.7.5.3) and a Sliding Clamp (#3.7.5.4), as shown on FIG. 19. The Short Band and the Long Band are arranged parallel to each other with their ends aligned and both attached to the same Fixed Clamp at one side. The Sliding Clamp is used to adjust length of the "loose" end of the Long Band which can be bent when the latter is clinged to a pocket edge, a belt etc., as shown on FIG. 19(*e*).

The Fixture Rod can be also used to temporarily attach various accessories to the device, including a tripod and a second computer-communicator device of the same design. Under the latter configuration, the bundle of the two devices can be used to perform as a 3D camera, a binocular etc.

2.4 Half-Rolled State

In this State, the device exposes only a portion of the display that is sufficient for many applications while featuring more compact shape than in the Unrolled or Desktop Unrolled State. The device's processor may have software instructions to leave non-visible portion of the display black to conserve power if this State is detected. The dedicated set of four Attachment Points (visible on FIGS. 1 and 4) is used to hold the device half-rolled as shown on FIGS. 17 and 18. The Double-hand Keypad (#1.6.4) of the Outer Touchpad Keyboard (#1.6) is operated by both hands as shown on FIG. 18 while the thumb of the "inner" hand (usually a left hand) operates the Inner thumb Keypad for Half-rolled State (#1.7.1) belonging to the Inner Touchpad Keyboard (#1.7) as shown on FIG. 17, and the thumb of the "outer" hand (usually a right hand) operates the Outer Thumb Keypad (#1.6.1.1) belonging to the Inner Touchpad Keyboard (#1.7) as shown on FIG. 17 also.

In this State (as well as the Unrolled and Desktop Unrolled States) the Camera Module (#2.1.6) can be fully extended and rotate at the angle of approx. 300 degrees around the axis perpendicular to the main axis of the core Module (#2) (i.e. the Axis Y on the figures), to perform front-facing shooting (as shown on FIG. 17) as well as back-facing shooting. Beyond shooting, this State with the camera position shown on FIG. 17 is suitable for video chats and other applications requiring self-portrait.

3. Examples of other Possible Versions or Extensions of the Device and its Components 3.1 The Touchpad Keyboard units may be implemented with wireless connection to the host device;

3.2 The Touchpad Keyboard units may be connected to each other while only one of them is connected to the host device via a wire or wirelessly;

3.3 The Touchpad Keyboard unit may be implemented as an accessory to existing devices (laptop PCs, desktop PCs, tablet PCs etc.) and sold separately;

3.4 The Removable Earpiece may be implemented as independently sold accessories for existing devices such as laptop PCs, mobile phones, etc.

3.5 if the Touchpad Keyboard unit is implemented with wireless connection to the host device, one or two such units can be affixed temporarily to a steering wheel (wrapped around it) to facilitate the device control while driving;

3.6 The camera module may be implemented as a replaceable module and the replacement modules may contain different sensors and/or other electronic components;

3.7 The Outer Module may comprise a second (front-facing) camera on its front side;

3.8 The release mechanism for the Camera Module and the Viewfinder assembly may be adjusted automatically to release both to a proper positions depending on the current State of the device;

3.9 The second speaker may be placed on the Core Module to enable stereo sound;

3.10 The second Removable earpiece (with a simpler design than that of the first one) may be placed between the Camera Cap and the first Removable Earpiece to enable stereo wireless listening;

3.11 The Screen Hood component may be transformed into a stand or a shoe helping to keep the device at appropriate angle to a desk etc. surface.

5. Detailed Technical Structure of the Example Embodiments

This Section is contained entirely in the separate document named Appendix to the Specification. It outlines the technical structure of example embodiments using a hierarchical representation and it references other documents using the same Drawing numbers (i.e. FIG. 1, FIG. 15(*a*), etc.) and the same component numbers (for example, #1.1 for the Flexible Screen component of the described embodiment of the device).

6. Terminology Used in this Document and the Related Documents

Host device—a device that provides mechanical enclosure and/or electrically powers and/or electronically controls another device.

Component—any technically or logically distinguishable part or section of a device, which may exist as a separate part or assembly at some point in the process of manufacturing the device.

Assembly—one of the higher-level components that the device can be disassembled into.

Sub-assembly—one of the mid-level components that an Assembly or a Sub-assembly can be disassembled into.

Part—a component of a device, belonging to a Sub-assembly, Assembly or directly to the device itself, which cannot be decomposed (with the level of detail chosen in this Detailed Description section) into any components.

Group—a collection of similar or identical components that can be described together for convenience.

Version—some of the devices may be implemented in several Versions which will share the same primary functions but differ in the components included, physical layout/design etc. Typically a user purchases and/or operates a single Version of a device.

State—one of the user-selectable physical configurations of the device.

Attachment/Connection Type—determines how a component is connected to its component (e.g. a Part to parent Sub-assembly, a Sub-assembly to a parent Assembly etc.) or how a device is attached to its Host device. See below for specific Types.

Permanent attachment—type of mechanical connection (with or without electrical connection) between two or more components of a single device which cannot be done or undone by a user, but only at authorized repair center for the device. This attachment is typically done or undone when a device is under repair.

Semi-permanent attachment—type of mechanical connection (with or without electrical connection) between two or more components of a single device which can be done or undone by a user, with possible use of common tools like a screwdriver. This attachment is typically done or undone when a device is being upgraded by a user or when a user replaces malfunctioning component(s).

Temporary attachment—type of reversible mechanical connection (with or without electrical connection) between two or more components of a single device which is routinely being undone and restored by the user during normal operation of the device.

Removable component—a component that is reversibly attached to its host device via a temporary mechanical attachment (with or without electrical connection).

The invention claimed is:

1. A portable computer-communicator device comprising:
   a core module; and
   a flexible assembly attached by its one side to the core module and capable of being rolled around the core module, the flexible assembly further comprising a flexible rollable display;
   wherein the core module has cylindrical shape;
   wherein the flexible assembly further comprises a plurality of rigidity bars each arranged parallel to a main axis of the core module;
   wherein the flexible assembly further comprises a plurality of flattening bands each arranged perpendicular to the main axis of the core module;
   wherein each flattening band is made of a steel band;
   wherein the plurality of flattening bands comprises at least one flattening band arranged with a convex side facing the flexible rollable display;
   wherein the plurality of flattening bands further comprises at least one flattening band arranged with a concave side facing the flexible rollable display;
   wherein the flattening bands are pressed against a back side of the rigidity bars by means of an elastic back cover, the back cover attached to the rigidity bars, the back cover surrounding each flattening band from three sides.

2. The computer-communicator device of claim 1, further comprising one or more touchpad keyboard units, each touchpad keyboard unit comprising:
   a touch sensitive surface;
   a plurality of relief points extending from the touch-sensitive surface and reversibly yielding to pressure applied by a finger or other object; and
   instructions stored in a memory for presenting on a visual display finger touches on the touch sensitive surface, images of the touches superimposed over an image of a keyboard.

3. The computer-communicator device of claim 2, wherein the touch sensitive surface is capable of detecting positions of touching multiple fingers, in real time.

4. The computer-communicator device of claim 2, wherein the relief points are covered by the touch sensitive surface.

5. The computer-communicator device of claim 2, wherein the relief points protrude through openings defined in a layer comprising the touch-sensitive surface.

6. The computer-communicator device of claim 5, further comprising a removable earpiece.

7. The computer-communicator device of claim 6, wherein the removable earpiece can perform functions of a wireless mouse.

8. The computer-communicator device of claim 7, further comprising a projection module, the projection module located in a bottom section of the core module, the core module being held vertically.

9. The computer-communicator device of claim 8, wherein the projection module comprises a transparent window.

10. The computer-communicator device of claim 9, wherein a specific portion of the flexible rollable display is wrapped around the transparent window whenever the device is in its rolled or half-rolled state.

11. The computer-communicator device of claim 10, wherein the device stores software instructions in a memory, the instructions specifying a method of producing specifically processed images with a specifically adjusted brightness level and only on the specific portion of the flexible rollable display whenever the device is in its rolled or half-rolled state.

12. The computer-communicator device of claim 10, wherein the projection module comprises a mirror which reflects images displayed on the specific portion of the flexible rollable display in the direction parallel to the main axis of the core module.

13. The computer-communicator device of claim 10, wherein the projection module comprises a viewfinder assembly further comprising a viewfinder lens.

14. The computer-communicator device of claim 13, wherein the viewfinder assembly can slide out from a retracted position to an extended position and be returned back to a retracted position.

15. The computer-communicator device of claim 14, wherein the projection module comprises a viewfinder cap, further comprising a second optical system, and a projection screen.

16. The computer-communicator device of claim 15, wherein the second optical system, in cooperation with the mirror and the viewfinder lens, when the viewfinder assembly is in the retracted position, can project the images reflected by the mirror onto the back side of the projection screen, with distortion corrected and images properly focused.

17. The computer-communicator device of claim 16, wherein the mirror, in cooperation with the viewfinder lens, when the viewfinder assembly is in the extended position and the viewfinder cap is in the open position, can focus the images reflected by the mirror into user's eye placed near the viewfinder lens, with distortion corrected.

* * * * *